US011913624B2

(12) United States Patent
Strunk

(10) Patent No.: US 11,913,624 B2
(45) Date of Patent: Feb. 27, 2024

(54) TRIM AND SHIELD LIGHTING ACCESSORIES

(71) Applicant: Eric Lynn Strunk, Rockford, OH (US)

(72) Inventor: Eric Lynn Strunk, Rockford, OH (US)

( * ) Notice: Subject to any disclaimer, the term of this patent is extended or adjusted under 35 U.S.C. 154(b) by 0 days.

(21) Appl. No.: 18/081,067

(22) Filed: Dec. 14, 2022

(65) Prior Publication Data

US 2023/0184411 A1 Jun. 15, 2023

Related U.S. Application Data

(60) Provisional application No. 63/289,807, filed on Dec. 15, 2021.

(51) Int. Cl.
*F21V 17/06* (2006.01)
*F21V 21/04* (2006.01)

(52) U.S. Cl.
CPC .............. *F21V 17/06* (2013.01); *F21V 21/04* (2013.01)

(58) Field of Classification Search
CPC ................................. F21V 17/06; F21V 21/04
See application file for complete search history.

(56) References Cited

U.S. PATENT DOCUMENTS

| | | | |
|---|---|---|---|
| 3,974,371 | A | 8/1976 | Miles, Jr. |
| 4,475,147 | A | 10/1984 | Kristofek |
| 5,465,199 | A | 11/1995 | Bray et al. |
| D381,111 | S | 7/1997 | Lecluze |
| D417,746 | S | 12/1999 | Pahl |
| 6,082,871 | A | 7/2000 | Yeh |
| 6,425,680 | B1 | 7/2002 | Rippel et al. |
| 6,497,501 | B1 | 12/2002 | Harder |
| 7,121,696 | B2 | 10/2006 | Whitfield, Sr. |
| 7,198,391 | B2 | 4/2007 | Rutchik |
| 7,722,227 | B2 | 5/2010 | Zhang et al. |
| 7,874,706 | B2 | 1/2011 | Carle, Jr. |
| 8,201,968 | B2 | 6/2012 | Maxik et al. |
| 8,333,489 | B1 | 12/2012 | Witte |

(Continued)

FOREIGN PATENT DOCUMENTS

EP 2629124 A1 8/2013

OTHER PUBLICATIONS

International Search Report and Written Opinion dated Apr. 25, 2023 in related International Application No. PCT/US2022/052815 filed Dec. 14, 2022 (11 pages).

(Continued)

*Primary Examiner* — Christopher E Dunay
(74) *Attorney, Agent, or Firm* — Daniel F. Nesbitt; Nesbitt IP LLC

(57) ABSTRACT

A trim accessory and method of its use that attaches or retrofits to an existing recessed light fixture, and directs or restricts emitted light from the lighting fixture to areas or locations desired by the end user. The trim accessory attaches to the trim, and has a tapered annular panel with an outer surface, an inner surface, an outer edge, an annular inner portion, and one or more retainers along the annular inner portion that retain an outer periphery of the outer-extending trim of the recessed lamp, to secure the trim accessory against the ceiling or other surface using the recessed lighting fixture. The tapered annular panel extends outwardly and upwardly against the ceiling, to blend visually into the undersurface of the ceiling.

17 Claims, 13 Drawing Sheets

(56) References Cited

U.S. PATENT DOCUMENTS

| | | | |
|---|---|---|---|
| 8,348,477 B2 | 1/2013 | Tickner et al. | |
| 8,469,537 B2 | 6/2013 | Carle, Jr. | |
| 8,672,518 B2 | 3/2014 | Boomgaarden et al. | |
| 8,794,784 B1 | 8/2014 | Maloney et al. | |
| 8,967,844 B2 | 3/2015 | Boomgaarden et al. | |
| 9,140,441 B2 | 9/2015 | Goelz et al. | |
| 9,157,581 B2 | 10/2015 | Boomgaarden et al. | |
| 9,435,930 B2 | 9/2016 | Boomgaarden et al. | |
| 9,568,181 B2 | 2/2017 | Boomgaarden et al. | |
| 9,581,756 B2 | 2/2017 | Boomgaarden et al. | |
| 9,726,365 B1 | 8/2017 | Maxik et al. | |
| 9,739,470 B2 | 8/2017 | Boomgaarden et al. | |
| 9,851,490 B2 | 12/2017 | Boomgaarden et al. | |
| 9,890,941 B2 | 2/2018 | Boomgaarden et al. | |
| 10,072,835 B2 | 9/2018 | Maxik et al. | |
| 10,119,697 B2 | 11/2018 | Boomgaarden et al. | |
| 10,125,958 B1 * | 11/2018 | Wronski | F21V 21/047 |
| 10,760,776 B1 | 9/2020 | Stange et al. | |
| 11,221,124 B1 * | 1/2022 | Ryan | F21V 1/10 |
| 11,226,079 B2 * | 1/2022 | Vogtner | F21V 23/06 |
| 2005/0265016 A1 | 12/2005 | Rappaport | |
| 2014/0049957 A1 | 2/2014 | Goelz et al. | |
| 2016/0186967 A1 | 6/2016 | Mathews et al. | |
| 2020/0032988 A1 * | 1/2020 | Schubert | F21V 21/04 |
| 2020/0149717 A1 * | 5/2020 | Simmons, Jr. | F21V 17/005 |
| 2021/0231855 A1 * | 7/2021 | Armbruster | G02B 6/0001 |

OTHER PUBLICATIONS

LRS81: 6" CFL Wall Wash w/ Reflector {Liton) https://liton.com/wall-wash-w-reflector-51739.html (Jul. 2021), 2 pages.

LRS105 : 6" PAR20/CFL/A19 Wall Wash w/ Reflector Baffle (Liton) https://liton.com/wall-wash-w-reflector-baffle.html (Jul. 2021), 2 pages.

* cited by examiner

TRIM AND SHIELD LIGHTING ACCESSORIES

CROSS-REFERENCE TO RELATED APPLICATION

The present application claims the benefit of U.S. Provisional Application No. 63/289,807 filed on Dec. 15, 2022, the entirety of which is hereby incorporated by reference.

BACKGROUND OF THE INVENTION

Most new homes have installed ceiling recessed lighting, also referred to as "can" lights, as the primary light source. Typically several dozen recessed lights can be installed in several rooms, providing sufficient lighting within the home. More recently, these recessed lights utilize light emitting diode (LED) lamps. Sometimes a dimmer switch is installed on the LED lights, but sometimes the LED recessed lights are wired with a standard switch, without a dimmer switch. LED lights in particular emit very bright "point source" light. This bright light can be distracting or irritating to the eye, even when a dimmer switch is used in an attempt to decrease the light output to the surrounding areas. The addition of a dimmer switch does provide temporary relief, as a significant decrease in the brightness was achieved. However, there remains a need for a better method and means of reducing the undesirable direct lighting.

One solution is to remove the LED recessed unit and replace it with a light assembly that has a permanent or fixed hood, or uses a gimbal, eyeball, or other light focusing method. This option would add significant cost to the lighting solution.

A need remains for a retrofittable device that can be attached to existing recessed lighting in order to restrict or limit the light emitting from the lamp to only areas where lighting is needed, and to block or screen light from the lamp to other areas, and particularly to areas in the line of sight of persons, to restrict or eliminate direct visibility of the lamp that is emitting the light from the majority of the room or area.

SUMMARY OF THE INVENTION

A trim accessory according to the present invention provides an aesthetically unique appearance to a recessed lamp, to which it is attached, installed into a ceiling or other light-bearing surface.

In various embodiments of the invention, the trim accessory is attached to and extends around the entire outer-extending trim of a recessed lamp or lighting fixture.

In various embodiments, the trim accessory is attached to the entire annular portion of the outer-extending trim of a recessed lamp or lighting fixture.

In various embodiments, the trim accessory includes a tapered annular panel having an annular outer edge that extends radially outwardly and beyond a radially distal periphery of the outer-extending trim of the recessed lamp, and a retainer that extends radially inwardly that is engaged with the recessed lamp to support and hold the trim accessory in place against a ceiling.

In various embodiments of the invention, the tapered annular panel has an axially down-facing surface that faces away from the ceiling or other light-bearing surface, when the trim accessory is attached to the recessed lamp, and an axially up-facing surface that faces towards the ceiling or other light-bearing surface when the trim accessory is attached to the recessed lamp.

In various embodiments of the invention, the outer-facing surface of the tapered annular panel can be a planar surface.

In various embodiments, a trim accessory in provided and is configured to attach to a trim of a recessed lamp, the trim accessory comprising: i) an annular inner portion; ii) a tapered annular panel extending radially outwardly from the annular inner portion, including an axially down-facing surface, an axially up-facing surface, and an annular radially-outer edge; and iii) one or more retainer extending radially outwardly from the annular inner portion, that includes a confined member that confines a radial or lateral movement of the outer-extending trim of the recessed lamp, and a captured member that engages and confines an axial, upward movement of the outer-extending trim of the recessed lamp.

In various embodiments of the invention, the outer-facing surface of the tapered annular panel can be circular.

In various embodiments of the invention, the tapered annular panel can taper from the annular inner portion thereof toward a tip of the annular outer edge at a tapered angle relative to an axial centerline of trim accessory.

In some embodiments, the axially down-facing surface of the tapered annular panel extends from the annular inner portion to the tip of annular outer edge at a first angle ($\alpha$) relative to a plane (p) defined by the tip of annular outer edge, the plane p being normal to the axial centerline of trim accessory. The plane p extends along the surface of the ceiling or other light-bearing surface.

In various embodiments, the axially down-facing surface and the axially up-facing surface of the tapered annular panel has either a constant thickness, or a thickness that tapers inwardly toward the annular outer edge.

In various embodiments of the invention, the thickness of the annular outer edge is outwardly tapering to a tip. In some embodiments, the axially down-facing surface and the axially up-facing surfaces of the annular outer edge taper inwardly (narrows) toward the tip, at a relative second angle ($\beta$).

In various embodiments of the invention, the tip can have an outer radius of about half the thickness of the annular outer edge; or an outer radius of at least half the thickness of the distal-most portion of the annular outer edge. In some embodiments, an outer radius of less than half the thickness of the annular outer edge.

In various embodiments of the invention, the annular inner portion attaches the trim accessory to the outer-extending trim of the recessed lamp with a retainer that is engaged by an outer peripheral portion of the outer-extending trim of the recessed lamp, to secure the trim accessory to the recessed lamp.

In various embodiments of the invention, the retainer is an integral element of or with the annular inner portion of the trim accessory, that extends radially inwardly from the annular inner portion. In various embodiments of the invention, the retainer is a separate element that is affixed to the annular inner portion of the trim accessory, and extends radially inwardly from the annular inner portion. The affixment of the separate retainer to the annular inner portion of the trim accessory can be a mechanical affixment, an adhesive affixment, a magnetic affixment, a threaded affixment, a frictional affixment, or a combination thereof.

In various embodiments of the invention, the retainer comprises an outer member having an up-facing surface that confines a radial movement of the outer-extending trim of the recessed lamp, and a captured member that confines an axial movement of the outer-extending trim of the recessed lamp. The outer member of the retainer provides an outline of a planer space that has dimensions at large as, and preferably larger than, the outer periphery of the outer-extending trim of the recessed lamp. In other words, the outline of planar space accommodates a footprint of the outer-extending trim of the recessed lamp.

In some embodiments of the invention, a retainer can include a single segment or element integral or unitary with the annular inner portion that continues annularly with the annular inner portion, around most of or the entirety of a circumference of the annular inner portion. In some embodiments, the retaining means can include two, three, four or more separate segments, each integral or unitary with the annular inner portion, that are spaced apart and distributed, for example, evenly or intermittently, along the circumference of the annular inner portion.

In various embodiments of the invention, the retainer or the retaining means can comprise one or more of a pocket or a ledge that surround and retain, both radially and axially, the outer peripheral portion of the outer-extending trim of the recessed lamp.

In various embodiments of the invention, the retainer is configured to cause the outer-extending trim of the recessed lamp to pull the annular outer edge of the tapered annular panel of the trim accessory into contact, and preferably complete and continuous contact around the periphery of the annular outer edge, with the ceiling or other light-bearing surface that surrounds the recessed lamp.

In various embodiments, an up-facing surface of the retainer extends a first distance axially (d1) from the plane p defined by the periphery of the tip of the annular outer edge of the tapered annular panel.

The present invention also provides a result of seeing the light that is emitted by a recessed light source into the area of lighting need or interest, but avoiding the visibility of the light source itself, to "Use the light but don't see the light".

The present invention can provide a device and a method of its use that attaches or retrofits to an existing recessed light fixture, and directs or restricts emitted light from the lighting fixture to areas or locations desired by the end user.

In various embodiments of the invention, the trim accessory provides for blocking or screening of light emitted from the recessed lamp.

In various embodiments of the invention, the trim accessory includes a shield extending axially outwardly and radially inwardly from along at least a portion of the annular inner portion.

In various embodiments of the invention, the shield is formed integrally with the annular inner portion of the trim accessory.

In various embodiments of the invention, the shield is a separate element that is affixed to the annular inner portion of the trim accessory. The affixment of the separate shield to the annular inner portion of the trim accessory can be a mechanical affixment, an adhesive affixment, a magnetic affixment, a threaded affixment, a frictional affixment, or a combination thereof.

In various embodiments of the invention, the shield is a separate element that is suspended from or hung from the annular inner portion of the trim accessory.

In various embodiments of the invention, the shield extends radially inwardly from its proximal edge along a circumference portion of the annular inner portion of the trim accessory, along a base arc of at least 15 degrees and up to 360 degrees. The radially-inward distal edge of the shield can extend along an edge arc, independently of the base arc of extension of the shield itself, of at least 15 degrees and up to 360 degrees. The edge arc can be the same or less than the base arc.

The trim accessories and elements thereof as described herein can be made by any well-known method for forming the materials of the trim accessories or elements thereof, including without limitation a molding or three-dimensional printing (3DP) system and method.

In various embodiments, an element of the trim accessory can be made from a material, and can include an affixing means or attachment element made from another material, for affixing the element to another element of the trim accessory, or to the trim of the recessed lamp. A preferred example of a material is a polycarbonate/acrylonitrile butadiene styrene (PC/ABS), available from Bayer as Bayblend FR-110®

Non-limiting examples of light-bearing surfaces can include ceilings, walls, and floors of a building, room, and structures thereof, such as pools, decks, patios, gazebos, and vehicle, as well as any other construction or structure that uses a recessed lamp or light.

DETAILED DESCRIPTION OF THE INVENTION

Figure 1:
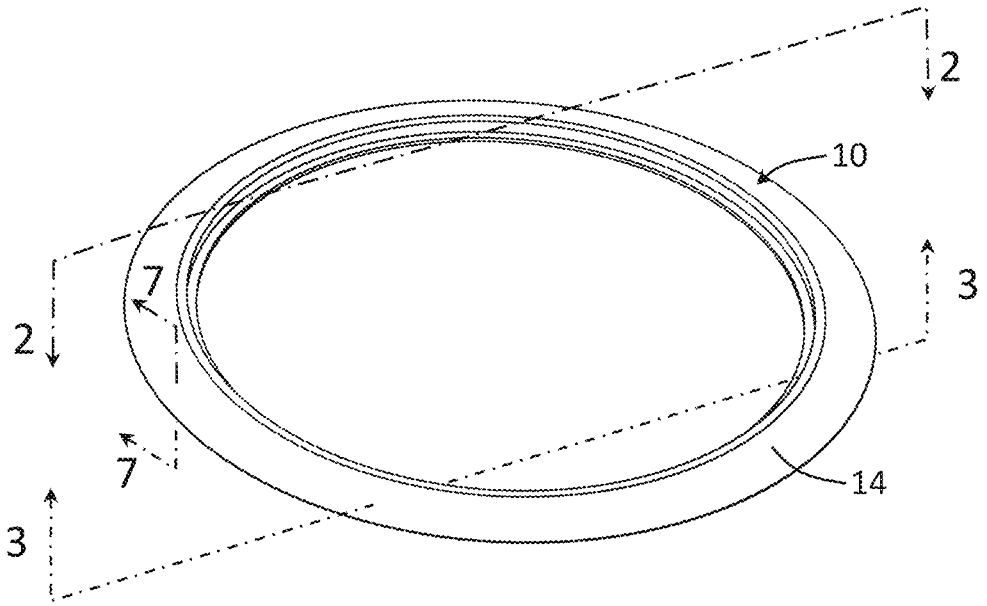
FIG. 1 shows a perspective view of a trim accessory of the present invention.
Figure 2:
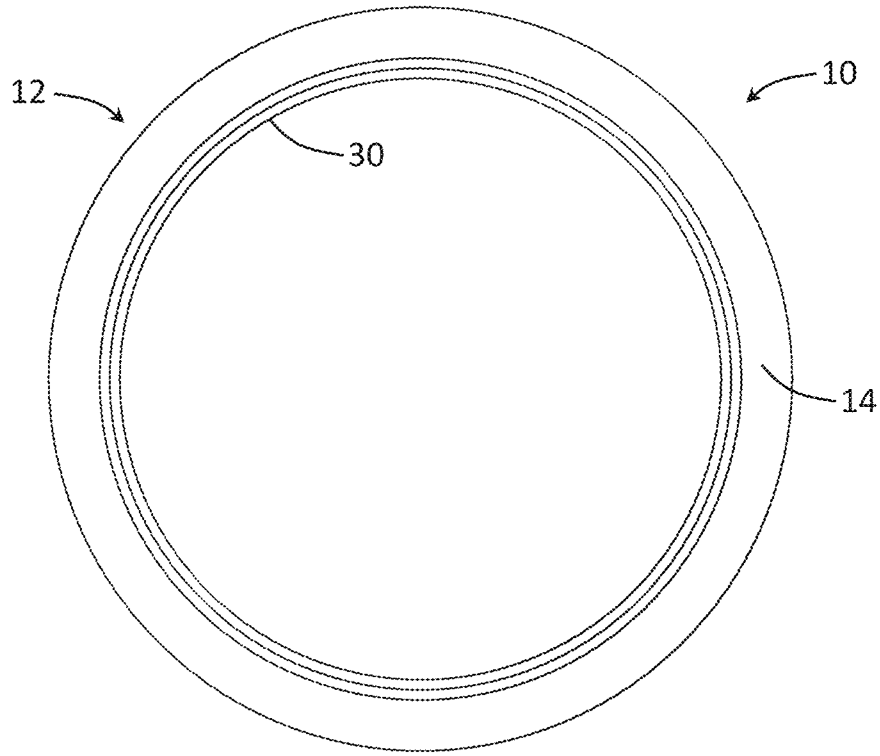
FIG. 2 shows a plan view of the trim accessory of FIG. 1.
Figure 3:
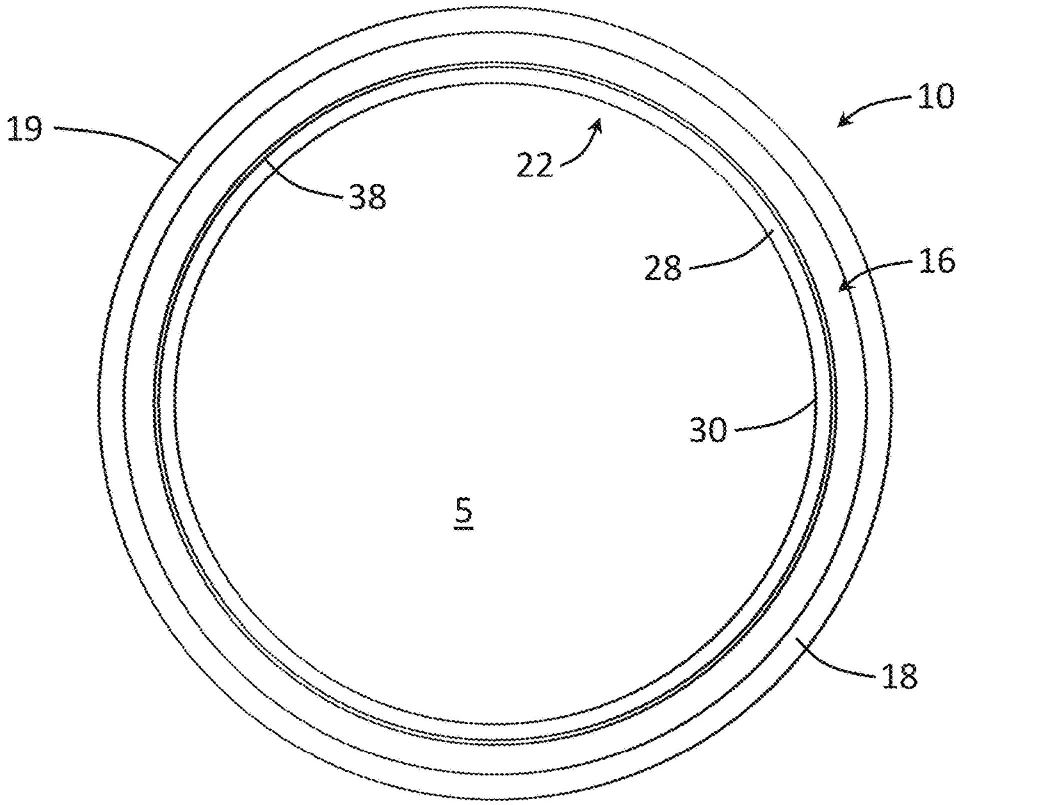
FIG. 3 shows a plan view of an opposite face of the trim accessory of FIG. 1.

FIG. 1 shows a perspective view of a trim accessory 10 for use with a recessed lamp, showing a view of the trim accessory as would be seen by a person when the trim accessory is attached to recessed lamp installed within a ceiling of a room, showing an axially down-facing surface 14 of the trim accessory 10. FIG. 2 shows a plan view of the trim accessory 10 as would be seen by a person when the trim accessory is attached to recessed lamp installed within a ceiling of a room, viewing the axially down-facing surface 14 of the trim accessory 10, and an annular inner edge 30. FIG. 3 shows a plan view of an opposite face of the trim accessory 10, viewing the axially up-facing surface 16 of the trim accessory 10. The trim accessory 10 provides an open space 5 within the trim accessory 10 that accommodates a body of a recessed lamp that is recessed into an opening in a ceiling. A unitary annular retainer 22 extends radially inwardly from an annular inner portion to the inner edge 30, including a ledge 28 and an inner surface 38 for retaining an outer-extending trim 92 of the recessed lamp 90.

Figure 4:
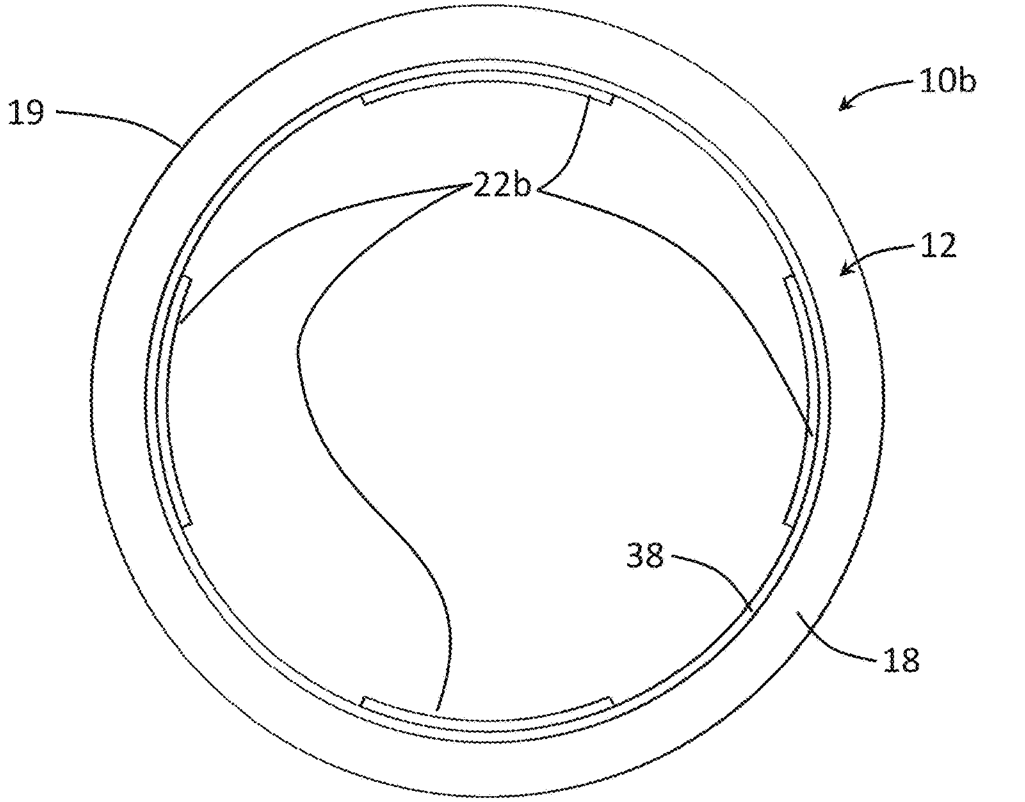
FIG. 4 shows a plan view of another embodiment of a trim accessory.

FIG. 4 shows an alternative embodiment of a trim accessory 10*b* that includes a plurality of retainer segments 22*b* distributed along the inner surface 38.

Figure 5:
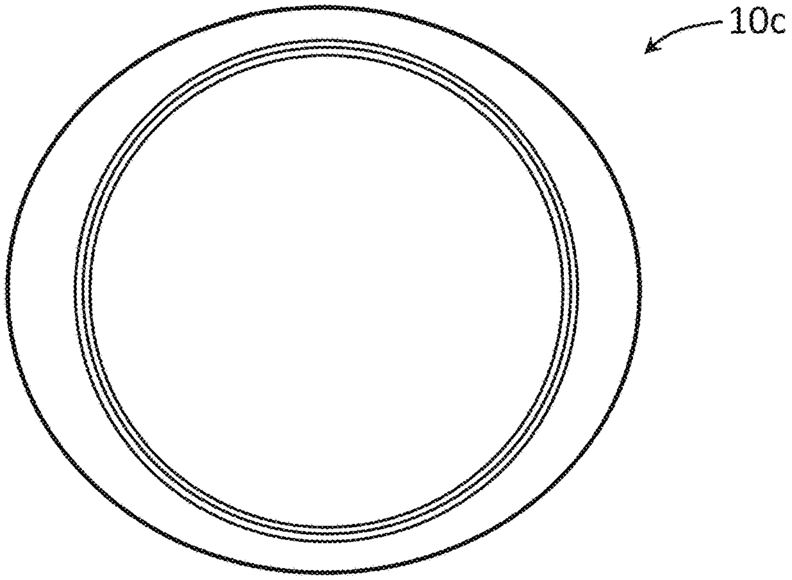
FIG. 5 shows an alternative embodiment of a trim accessory having an oval shape.
Figure 6:
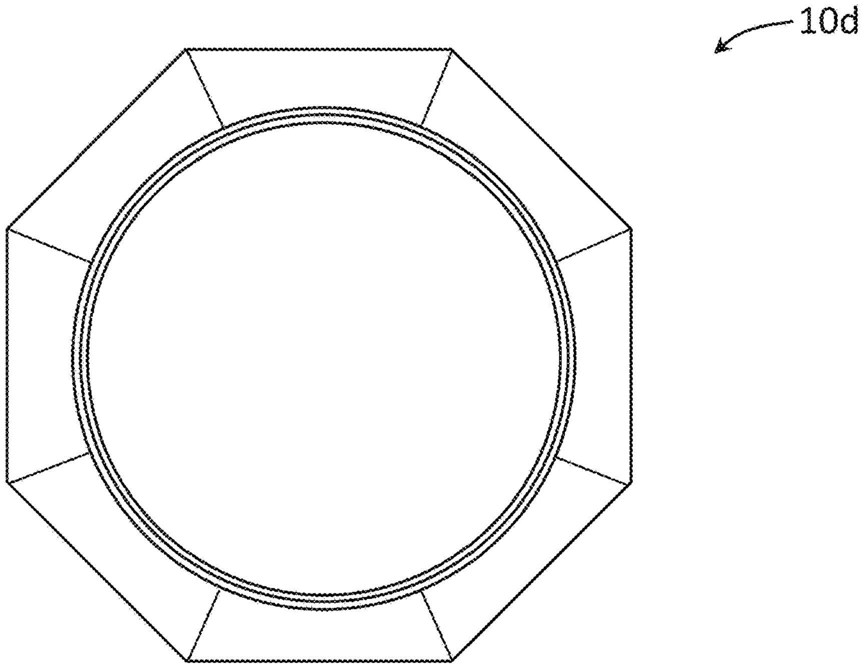
FIG. 6 shows an alternative embodiment of a trim accessory having an octagonal shape.

Although the trim accessory is illustrated having an outer periphery of a circular shape, the outer edge can have a non-circular shape. Non-limiting examples of a non-circular shape can include an oval, such as illustrated in FIG. 5, a polygon, or any other ornamentally-desired shape; polygon shapes can be regular polygons, such as squares, pentagon, hexagons, heptagons, and octagons, such as that shown in FIG. 6, and even of an irregular or other shape.

Figure 7:
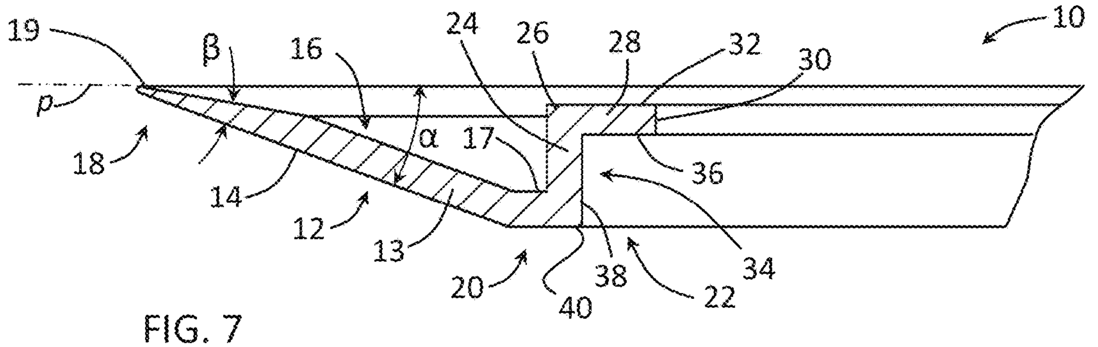
FIG. 7 shows a sectional view through an annular portion of the trim accessory of FIG. 1.

FIG. 7 shows a sectional view through an annular portion of the trim accessory 10 of FIG. 1. The trim accessory 10 includes a tapered annular panel 12 and an annular inner portion 20. The tapered annular panel 12 has an axially down-facing surface 14 that faces downward when installed, away from a ceiling and towards a floor, and would be seen by a person, and an axially up-facing surface 16 that faces upward when installed and would be confronting the ceiling portion surrounding the recess opening 84, shown in FIG. 8.

As shown and described, the tapered annular panel 12 and the annular inner portion 20 are circular in shape, and retain a uniform size and shape around the periphery to form a closed ring, and extends around the entire outer-extending trim of a recessed lamp. In other embodiments, size and shape of the tapered annular panel and/or the annular inner portion can vary around the periphery of the closed ring.

In other embodiments, the opposite ends of tapered panel and the inner portion are formed into an annular shape, shown as a circle, but do not form a closed ring. In such an embodiment, the tapered panel and the inner portion are nonetheless referred to a tapered annular panel and an annular inner portion.

Figure 8:
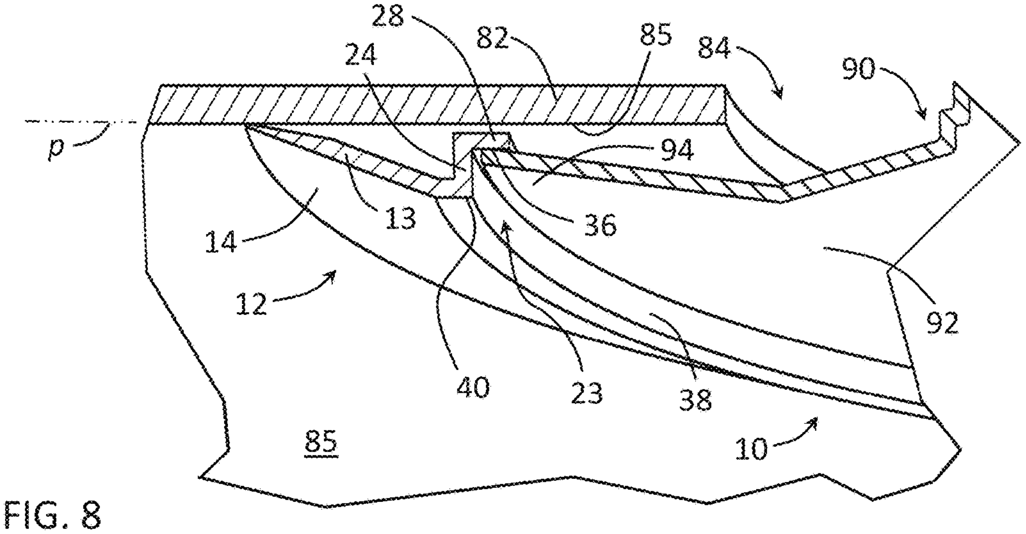
FIG. 8 shows the annular portion of the trim accessory attached to an outer-extending trim of a recessed lamp.

The tapered annular panel 12 includes a substantially planar body 13 and an annular radially outer edge 18, which as illustrated tapers to a tip 19. The outer-facing surface 14 is illustrated having a frustoconical shape as shown in FIGS. 7 and 8, from the annular inner portion 20 to the tip 19. Alternatively, the outer-facing surface, in vertical cross section, can be a curved surface, either convex or concave, or a multi-facet surface having a plurality of radially-arranged annular facets. In alternative embodiments in which the outer edge has non-circular shape, as described herein; for example, an oval, a polygon (to provide a frustopyramidal shape), or any other ornamentally-desired shape, the outer-facing surface, in vertical cross section, can similarly be a planar surface, a curved surface (either convex or concave), or a multi-facet surface.

Figure 9:
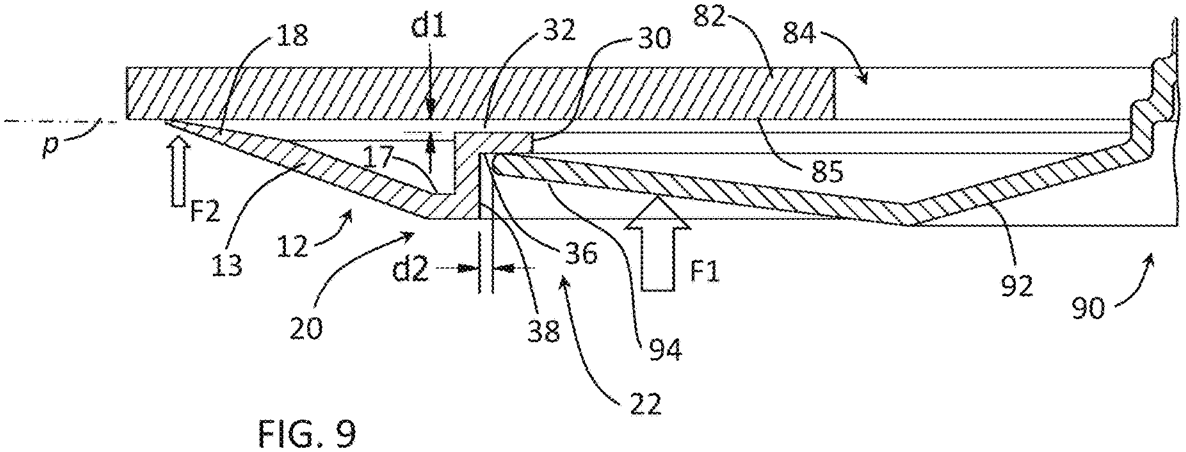
FIG. 9 shows the annular portion of the trim accessory attached to an outer-extending trim of a recessed lamp, in complete and continuous contact with the ceiling surface that surrounds the recessed lamp.

As shown in FIGS. 8 and 9, the annular outer edge 18 extends radially outwardly and beyond a radially-distal, outer periphery 94 of the outer-extending trim 92 of the recessed lamp 90. In the illustrated embodiment, the body portion 13 of the annular panel 12 has a constant thickness from proximate or near the annular inner portion 20, to or toward the annular outer edge 18, and the annular outer end 18 tapers (thinner) in thickness to the tip 19. Viewed in elevation, the axially down-facing surface 14 of the tapered annular panel 12 extends radially outwardly and axially (vertically), along a line, from proximate the annular inner portion 20 to the annular outer edge 18, at a first angle ($\alpha$) relative to a plane, the plane p defined by the periphery of the tip 19, the plane p being normal to the axial centerline 100 of the trim accessory 10. The first angle $\alpha$ is typically at least about 5 degrees, and up to about 60 degrees, and more typically about 15 degrees to about 25 degrees. As illustrated, the first angle $\alpha$ is about 20 degrees. The first angle $\alpha$ can be varied to a style or as desired from at least 10 degrees, or at least 15 degrees, and up to about 45 degrees, or up to about 30 degrees.

In some embodiments, the annular panel can have an outer surface with a shape of a non-uniform curve that is revolved around centerline of the trimm accessory. In some embodiments, the annular panel can have an outer surface with a shape of a completely irregular shape that varies, with no specific surface pattern, and can include the annular inner portion and the tip.

In other non-limiting embodiments, the annular panel can have a pattern of shapes formed into the surface, such as but not limited to dimples, and radial or circumferential ribs or ridges.

The thickness of the annular outer edge 18 is illustrated as outwardly tapering to a tip 19. In some embodiments, the axially down-facing surface 14 and the axially up-facing surfaces of the annular outer edge 18 define a thickness therebetween that tapers (thins) toward the tip 19, illustrated at a relative second angle (β). The second angle β is typically at least about 2°, and up to about 20°, and more typically about 8° to about 12°. As illustrated, the second angle β is about 10°. The second angle β can be varied to a style or as desired from at least 5°, or at least 6°, and up to about 15°, or up to about 18°. The selection of a second angle β is to provide an annular outer edge that visually blends into the horizontal surface of the ceiling. The second angle β provides a thinning of the annular outer edge 18 at its tip 19, which permits the material on the annular outer edge 18 to flex out of the plane of its unbiased state, especially when the trim accessory is pulled upwardly into contact, and preferably into complete and continuous contact around the periphery of the tip 19 of the annular outer edge 18, with the ceiling surface 85 that surrounds the recessed lamp, as shown in FIGS. 8 and 9. The thinness and flexibility of the tip 19 can allow the annular outer edge 18 of the tapered annular panel 12 to flex or confirm to a non-flat or uneven surface 85 of the ceiling 82 to create a better fit and better appearance than that of a rigid non-flexible trim, such as a metallic material.

At the thinning tip 19, the outer radius of the tip is about half the thickness of the distal-most portion of the annular outer edge, though can be more or less than half said thickness.

As shown in FIGS. 8 and 9, a retainer 22 of the annular inner portion 20 of the trim accessory 10 engages the outer-extending trim 92 of the recessed lamp 90. As shown in FIG. 9, the outer-extending trim 92 of the recessed lamp 90 engages the retainer 22 to hold the trim accessory 10 against a ceiling during use. In the illustrated embodiment, the retainer 22 is formed integrally with and extends radially inwardly from the annular inner portion 20, and includes one or more elements that retain and support all or portions of the outer periphery 94 of the outer-extending trim 92 of the recessed lamp 90, to confine or restrain the trim accessory 10 to the recessed lamp 90.

The retainer 22 comprises a confined member that confines and/or limits a radial (lateral, or side-to-side) movement of the outer-extending trim 92 of the recessed lamp 90. In the illustrated embodiment, an annular vertical wall 24 with a radially-inner surface 38 extends axially upwardly (vertically upwardly in use) from the up-facing surface 17 of the annular inner portion 20, and provides an outline in plan view of a planer space that has dimensions as large as, and preferably slightly larger than, the outer periphery 94 or footprint of the outer-extending trim 92 of the recessed lamp 90. In other words, the outline of planar space accommodates a footprint of the outer-extending trim of the recessed lamp, restraining relative lateral movement between the recessed lamp and the retainer 22.

The retainer 22 also comprises a captured member that engages and confines an axial movement of the outer-extending trim 92 of the recessed lamp 90. In the illustrated embodiment, the captured member of the retainer 22 restrains upward axial (vertical) movement of the outer-extending trim 92, while allowing the outer-extending trim 92 to move axially away from captured member. The captured member comprises a ledge 28 that extends radially inwardly from a distal end 26 of the axial member 24 to an inner edge 30. The ledge 28 has the down-facing surface 36 that engages with and attaches to the outer periphery 94 of the outer-extending trim 92. The ledge 28 extends radially inwardly to the inner edge 30 by a distance sufficient to define an outline in plan view of a planer space that has dimension or diameter smaller than that of the outer periphery 94 (or footprint) of the outer-extending trim 92 of the recessed lamp 90. In other words, the outline of planar space defined by the inner edge (or edges) 30 of the ledge 28 (captured member) is overlapped by the footprint of the outer periphery 94 of the recessed lamp 90. In the illustrated embodiment shown in FIG. 9, the outer periphery 94 of the recessed lamp 90 is spaced apart radially from the inner surface 38 of the annular vertical wall 24 of the retainer 22 by an average distance d2, which distance is less than the radial width of the downr-facing surface 36 of the ledge 28, and typically is one-half or less, one-third or less, or one-quarter or less, of the radial width of the down-facing surface 36 of the ledge 28. For a conventional recessed lamp having an outer-extending trim 92 with a diameter of six- to ten-inches, the average distance d2 for a trim accessory is about 0.03 inch to about 0.5 inch, more typically about 0.12 inch to about 0.25 inch.

The combination of the ledge 28, axial member 24, and annular inner portion 20 define an annular pocket 23 with a radially-inward slot, into which the outer periphery 94 of the outer-extending trim 92 of the recessed lamp 90 can be placed and retained. The pocket surrounds and retains, both radially and axially (toward the other), the outer periphery 94 of the outer-extending trim 92 of the recessed lamp 90. The vertical height of the inner surface 38 of the annular vertical wall 24, from the down-facing surface 36 of the ledge 28 to an annular inner surface 40 of the annular inner portion 20 is typically greater than a thickness of the outer periphery 94 of the recessed lamp 90.

The retainer means, including the outer member 34 illustrated by the annular vertical wall 24, and the captured member illustrated by the ledge 28, can extend annularly and completely into a ring. In various embodiments, the captured means, and the respective outer member and captured member, can include two, three, four or more separate segments 22*b*, as shown in FIG. 4, each integral or unitary with the annular inner portion and tapered annular panel (or tapered annular panel) and spaced apart and distributed along the circumference of the annular inner portion 20.

As shown in FIG. 9, the retainer 22 provides a pocket to allow a recessing mechanism (typically a spring) of the recessed lamp 90 to raise the outer peripheral 94 and pull the annular outer edge 18 of the tapered annular panel 12 of the trim accessory 10 axially inwardly into contact, and preferably complete and continuous contact, along the periphery of the annular outer edge 18, with the surface 85 of the ceiling 82 that surrounds the recessed lamp 90. An up-facing surface 32 of the retainer 22 is spaced from the plane p by a first distance axially (d1) to provide spacing or distance for the raising of the retainer 22 toward the ceiling 82 without the up-facing surface 32 contacting the undersurface 85 of the ceiling 82 when the annular outer edge 18 of the trim accessory 10 completely confronts and contacts the surface 85 of the ceiling 82. For a conventional recessed lamp having an outer-extending trim 92 with diameter of six- to ten-inches, the distance d1 for a trim accessory is about 0.06 inch to about 0.30 inch, more typically about 0.12 inch to about 0.20 inch, for example, about 0.18 inch.

In other embodiments, the retainer 22 can be a separate element that can be affixed to the annular inner portion of the trim accessory 10. The affixment of the separate retainer to the annular inner portion of the trim accessory can be a mechanical affixment, an adhesive affixment, a magnetic affixment, a threaded affixment, a frictional affixment, or a combination thereof.

Figure 10:
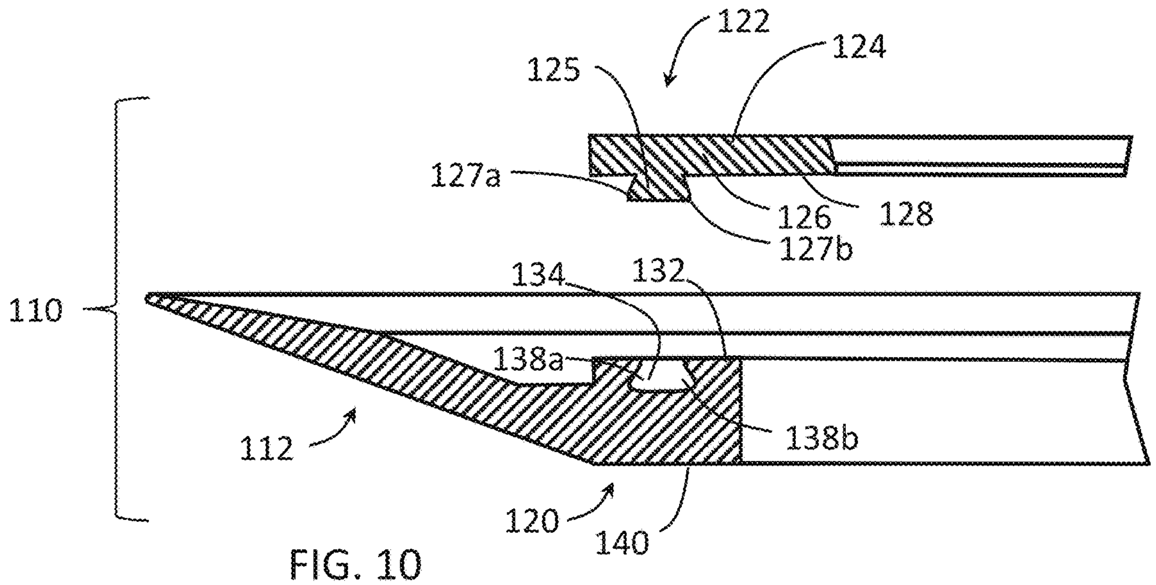
FIG. 10 shows another embodiment of a trim accessory and an affixed retainer as separate elements.
Figure 11:
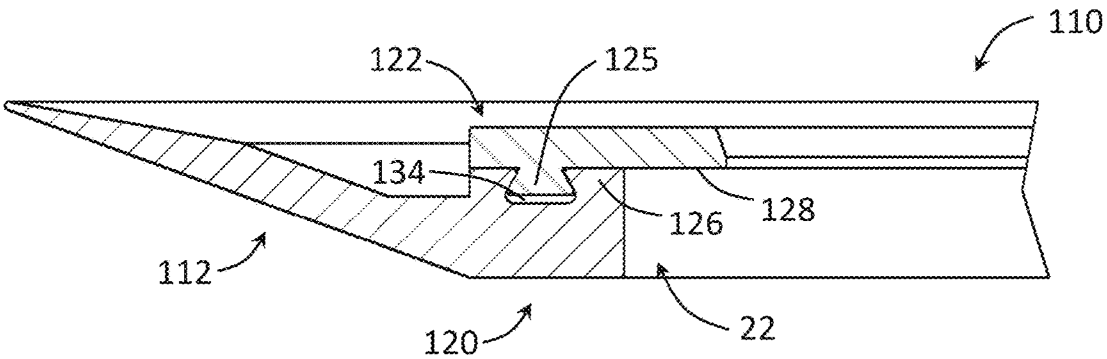
FIG. 11 shows the trim accessory and separated retainer of FIG. 10, with the retainer attached to an outer-extending trim of a recessed lamp.
Figure 12:
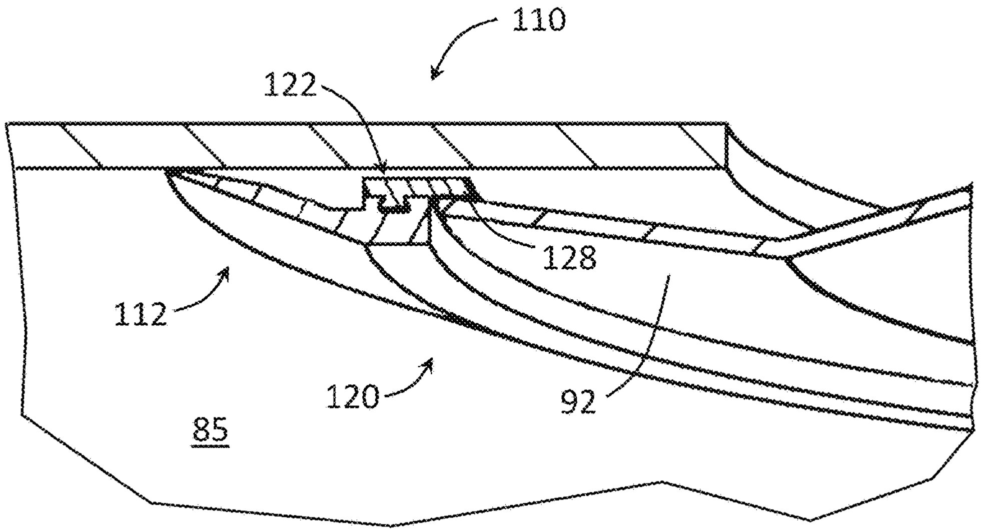
FIG. 12 shows the trim accessory and affixed retainer attached to the outer-extending trim of the recessed lamp, in contact with the ceiling surface that surrounds the recessed lamp.

FIGS. 10-12 show an alternative embodiment of a trim accessory 110 that includes a tapered annular panel 112 and a retainer ring 122 as separate elements that are affixed together to form a unit. The retainer ring 122 has a hanger element that extends from the undersurface, while the tapered annular panel 112 has an annular slot. The hanger element and slot are configured for easy and convenient insertion of the length of the hanger element into the annular slot, while maintaining the union of the hanger element within the slot and avoiding separation thereof after assembly.

In the illustrated embodiment, an annular inner portion 120 includes an axially-upwardly-facing surface 132 and an annular slot 134 formed into the axially-upwardly-facing surface 132. The axially-downwardly-facing surface 140 of the annular inner portion 120 can be smooth-surfaced for aesthetic effects. The separate retainer ring 122 comprises an annular ring-shaped plate 124 having an axially-downwardly facing surface 126, and a hanger element 125 having at least one shoulder 127 that extends laterally, radially outward and/or inwardly, and is configured to be inserted into the annular slot 134. In some embodiments as illustrated, the hanger element can include both radially-inner and -outer lateral shoulders. In the embodiment illustrated, the hanger element 125 has a pair of radially-opposed shoulder, illustrated as a radially-outer shoulder 127*a* and a radially-inner shoulder 127*b*. The cavity of the arcuate slot 134 includes corresponding pair of undercuts, illustrated as a radially-outer undercut 138*a* and a radially-inner undercut 138*b*, each undercut shaped to hold the corresponding shoulders 127*a*,127*b*. In a preferred embodiment, the hanger element 125 only has a radially-outer shoulder 127*a*.

The trim accessory 110 is assembled by first placing the retainer ring 122 onto the inwardly facing surface of the outer-extending trim 92 of the recessed lamp 90. The annular hanger element (or rib) 125 is disposed near a peripheral portion of the annular ring-shaped plate 124 of the retainer ring 122, and extends vertically downward from the axially-downwardly facing surface 126 of the peripheral portion of the annular ring-shaped plate 124 of the retainer ring 122. An inner annular portion of the ring-shaped plate 124 presents an annular surface that extends radially inwardly to form a ledge 128, which overlaps the outer periphery 94 of the outer-extending trim 92 of the recessed lamp 90, thereby allowing the annular ring-shaped plate 124 to rest upon the outer periphery 94 of the outer-extending trim 92 of the recessed lamp 90.

Once the retainer ring 122 is positioned, the tapered annular panel 112 is then positioned to register the annular slot 134 of the annular inner portion 120 with the annular rib 125 of the retainer ring 122. The tapered annular panel 112 can be attached to the retainer ring 122 by angling one of the laterally-extending sides 127*a*,127*b* of the hanger element 125 into and through the narrow opening of the annular slot 134 until the hanger element 125 fully enters the cavity of the arcuate slot 134, attaching the tapered annular panel 112 to the retainer ring 122, as shown in FIG. 11, and therewith, to the outer-extending trim 92 of the recessed lamp 90, as shown in FIG. 12.

In an alternative embodiment, conversely, the annular rib can be disposed on and extend vertically upward from an upper surface of the annular inner portion of the tapered annular panel, and the arcuate slot can be formed into the under surface of the retainer.

Figure 13:
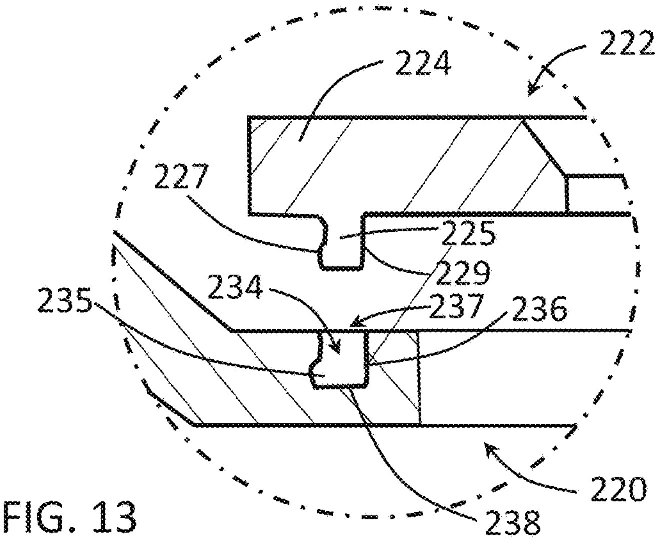
FIG. 13 shows an alternative engagement and attachment for the trim accessory with the retainer.

In another embodiment illustrated in FIG. 13, an annular inner portion 220 can have a slot 234 that has a molded base wall 238, a radially-inner wall 236, a radially-outer undercut 235 of a radial dimension that is slightly more than the radial width of the opening 237 into the slot 234. In various embodiments, the radially-outer undercut 235 is less than 10%, and preferably less than 5%, of the radial width of the opening 237 in the slot 234. The undercut 235 of the slot 234 aids in withdrawing of a molded part from a mold. An annular ring-shaped plate 224 of a separate retainer 222 can include an annular hanger element or rib 225 includes a radially-outer projection 227 that can be pressed through the opening 237 and into the undercut 235 of the slot 234 to engage within the undercut 235 when the hanger element 225 is inserted into the slot 234, while resisting separation of the hanger element 225 from the slot 234 under the weight of the tapered annular panel 220, ensuring a secure assembly of the annular inner portion 220 with the retainer 222.

Figure 14:
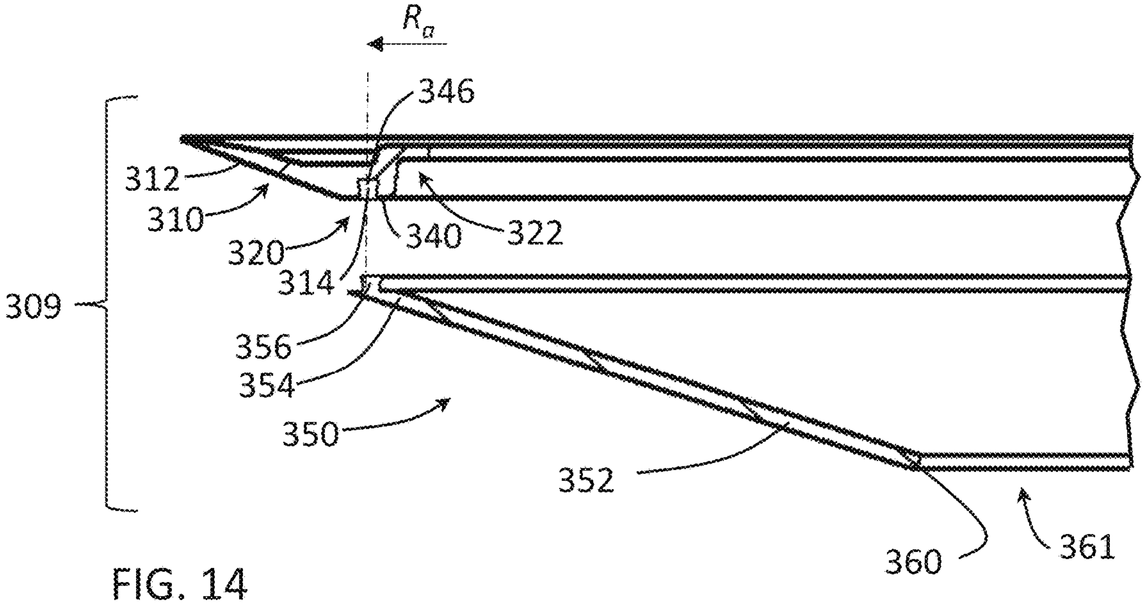
FIG. 14 shows a sectional view of another embodiment of a trim accessory and a separated, attachable shield.
Figure 15:
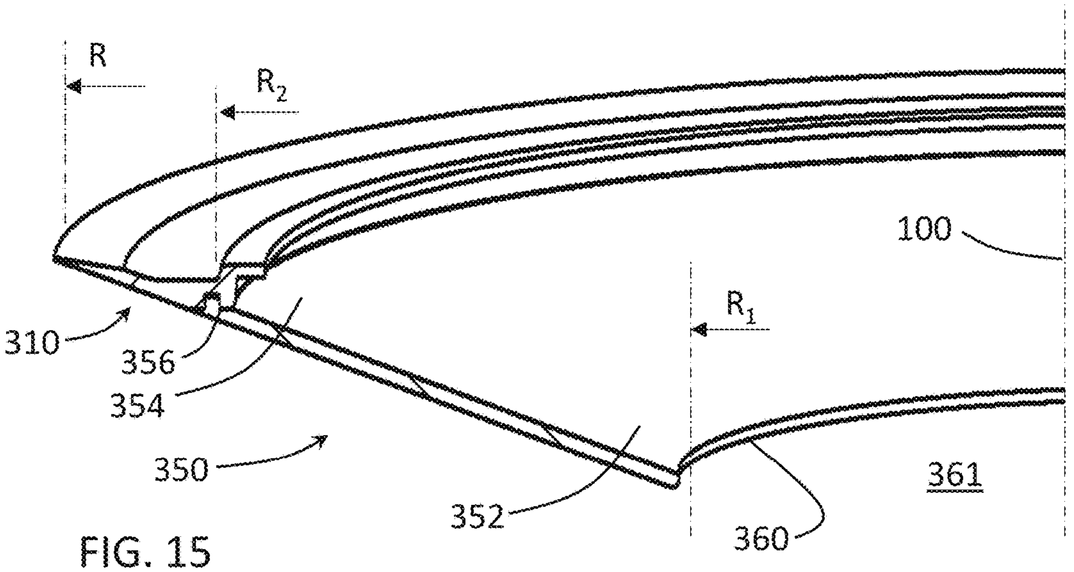
FIG. 15 shows the assembly of the trim accessory and the attached shield of FIG. 14.

FIGS. 14 and 15 show an embodiment of a trim-shield accessory 309 that shows a trim accessory 310 and a shield 350 that is a separate element.

The trim accessory 310 has a tapered annular panel 312 and an annular inner portion 320, and a retainer 322 extending radially inwardly from the inner portion 320. The tapered annular panel 312 and the retainer 322 are similar in configuration to the corresponding features of the embodiment illustrated in FIG. 7. The annular inner portion 320 has an annular inner surface 340 that provides an annular planar surface for mounting of the shield 350. The body of the annular inner portion 320 has a lower slot 314 formed or molded into the annular inner surface 340. In the illustrated embodiment, the slot 314 is an annular slot, and specifically a circular slot disposed along an arc radius $R_a$ of the trim accessory. The slot 314 in the annular inner surface 340 receives and retains a hanger element of a separate light-blocking shield, to attach and secure the shield to the trim accessory 310.

FIG. 14 shows the shield 350 as a separate element that can be affixed to the annular inner portion 320 of the trim accessory 310. The shield 350 has a light-blocking portion 352 that blocks or screens light emitted from the recessed lamp, and a proximal edge 354 that aligns with, and engages and attaches to, the annular inner portion 320 of the trim accessory 310. The affixment is shown as a hanger element 356 extending from the upper surface of the proximal edge 354 of the shield 350, that engages and attaches to annular slot 314 formed into an undersurface of the tapered annular panel 320 of the trim accessory 310, as described above using any of the described hanger elements and annular slots.

The light-blocking portion 352 extends into the light-emitting area to an inner edge 360 to form a light-emitting opening 361. As shown in FIG. 15, an inner edge 360 of the light-blocking portion 352 extends radially inwardly to a radius R1 from the center axis 100 of the recessed lamp 90. The ratio of the radius R1 to the inner edge 360 of the light-blocking portion 352 is about 10% to 90%, more typically about 30% to about 50%, and preferably about 40% to about 60% of a radius R2 of the proximal edge 354 of the shield 350.

Figure 16:
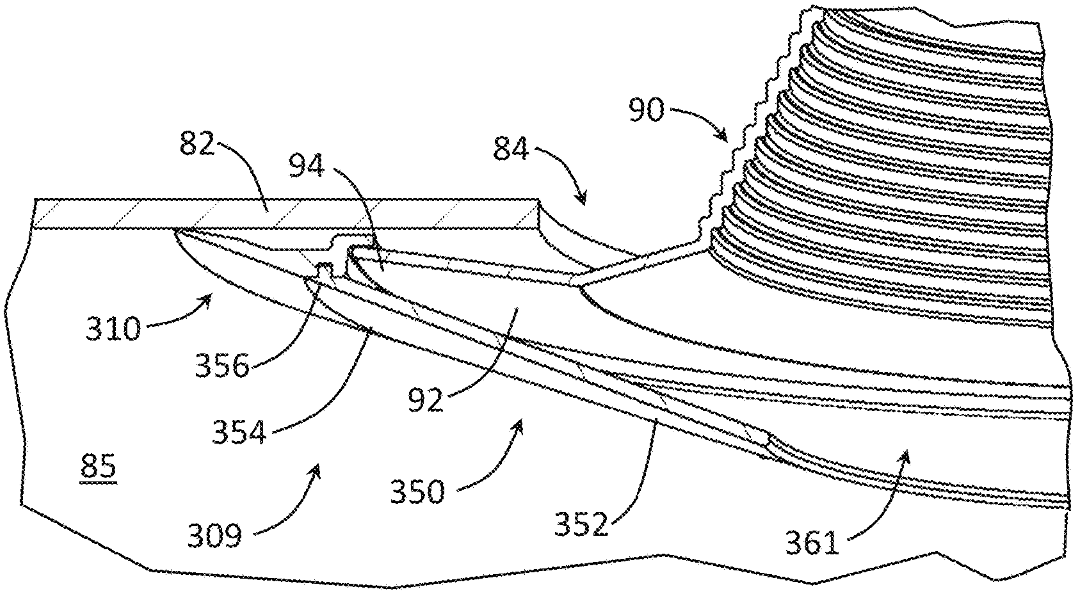
FIG. 16 shows the assembled trim-shield accessory of FIG. 14 with the retainer affixed to an outer-extending trim of a recessed lamp, in contact with the ceiling surface that surrounds the recessed lamp.
Figure 17A:
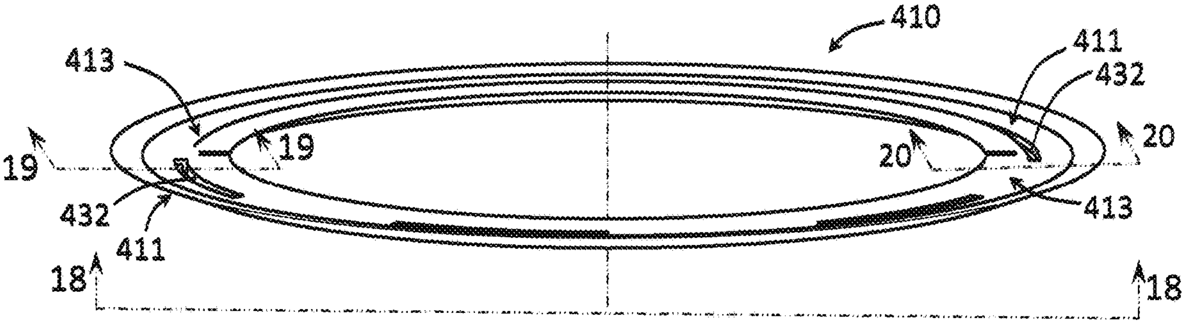
FIG. 17A shows a top perspective view of another embodiment of a trim accessory.
Figure 17B:
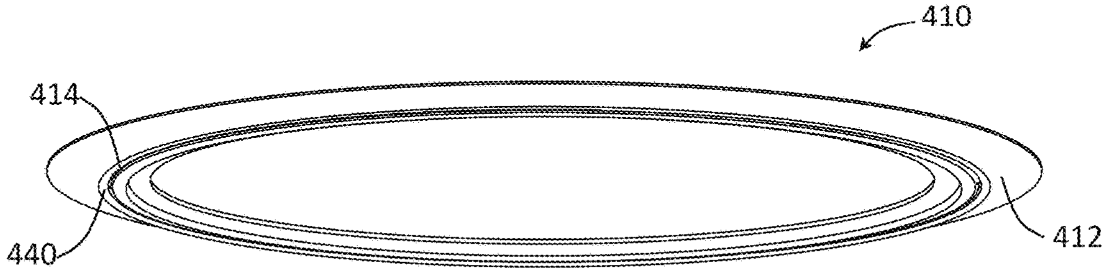
FIG. 17B shows a bottom perspective view of the another embodiment of the trim accessory of FIG. 17A.

In some embodiments, the proximal edge 354 of the shield 350 extends in an arc, less than the complete circumference, along the annular inner portion 320, the arc being at least 90 degrees and up to 270 degrees, more preferably of at least 120 degrees and up to 240 degrees, of the circumference of the annular inner edge 360. The greater the extension of the arc of the proximal edge 354 along the circumference of the annular inner portion 320, the better the engagment and affixing of the shield 350 to the trim accessory 310. FIG. 16 shows the trim-shield accessory 309 engaged with and attached to an outer-extending trim 92 of a recessed lamp 90, with the trim accessory 310 in contact with the ceiling surface 85 that surrounds the recessed lamp 90.

Figure 19:
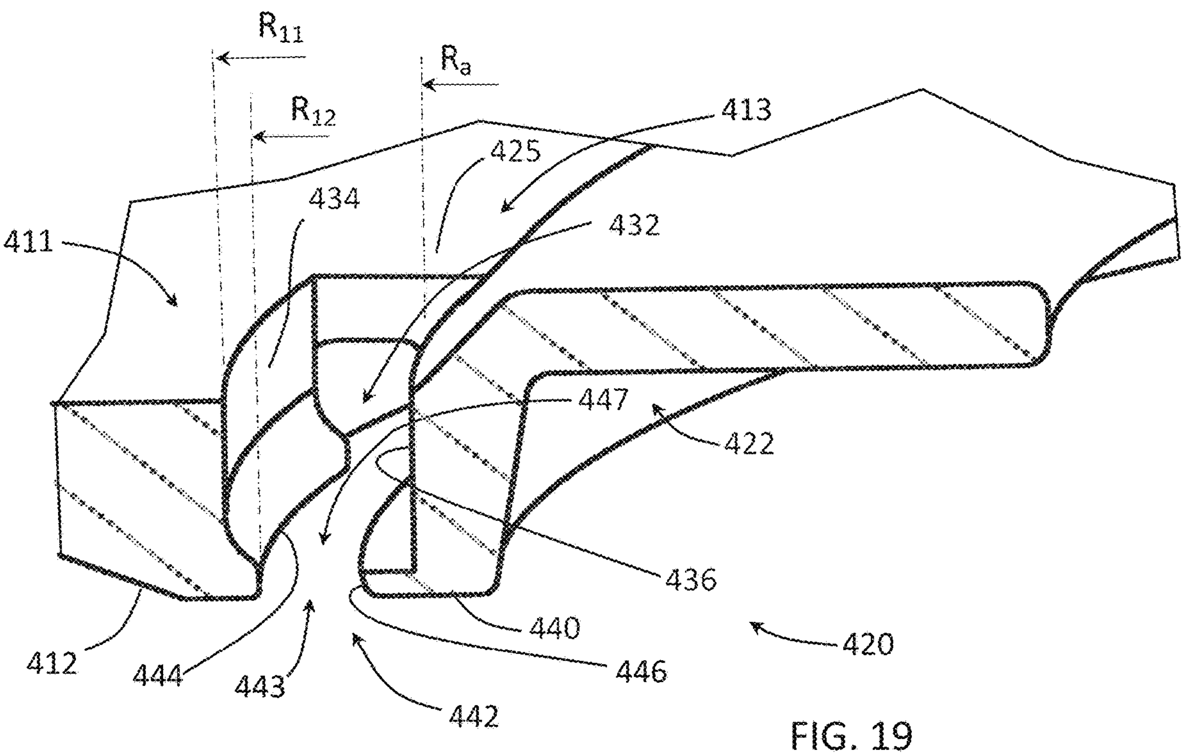
FIG. 19 shows a detailed sectional view of an engagement and attachment portion of the trim accessory through line 19-19 of FIG. 17A.
Figure 20:
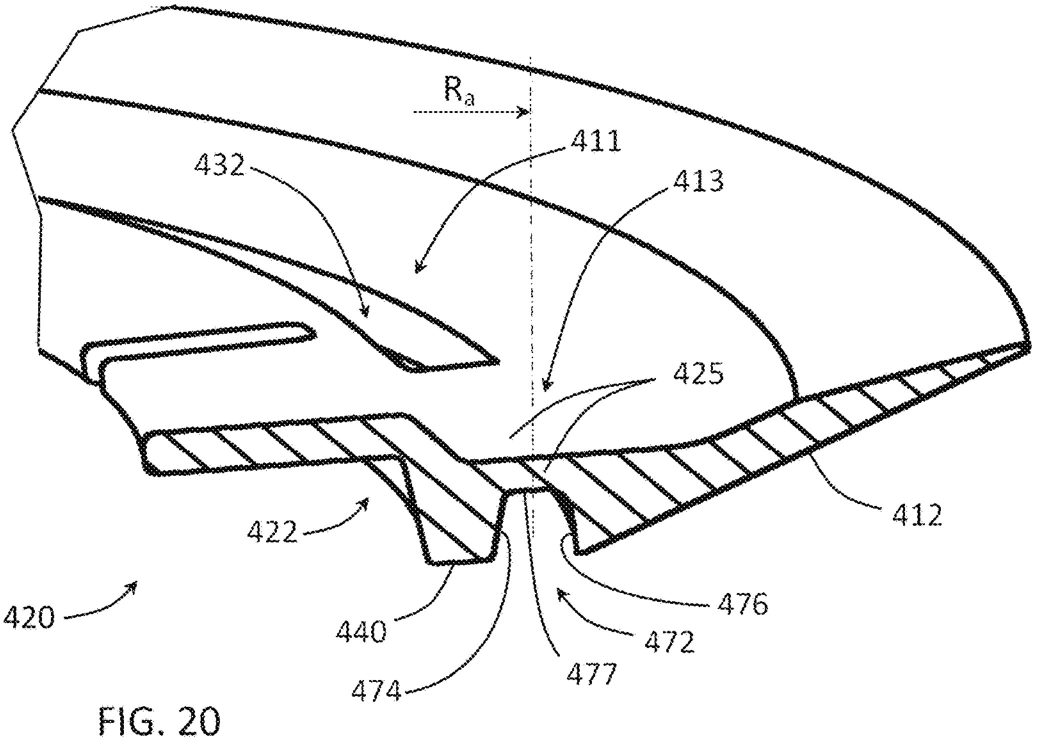
FIG. 20 shows a detailed sectional view of a bridging segment of the trim accessory through line 20-20 of FIG. 17A.
Figure 21:
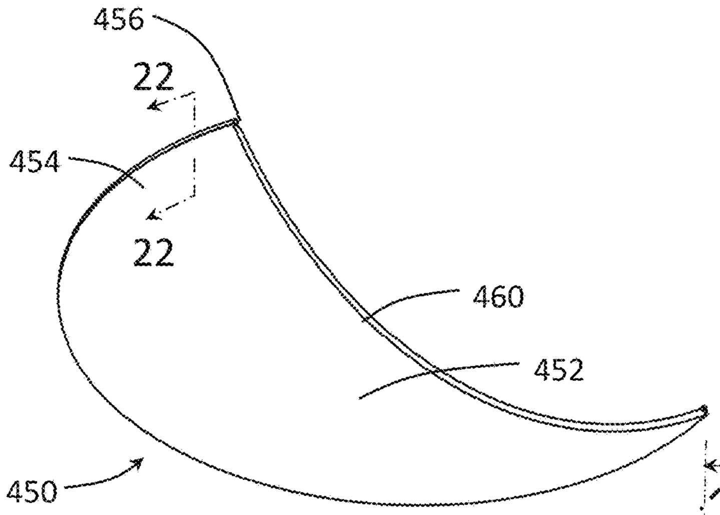
FIG. 21 shows a bottom perspective view of another embodiment of a light-blocking shield.

FIGS. 17A-20 show another embodiment of a trim accessory 410 configured for attaching a separate shield, for example, a shield assembly shown in FIG. 21.

Figure 18:
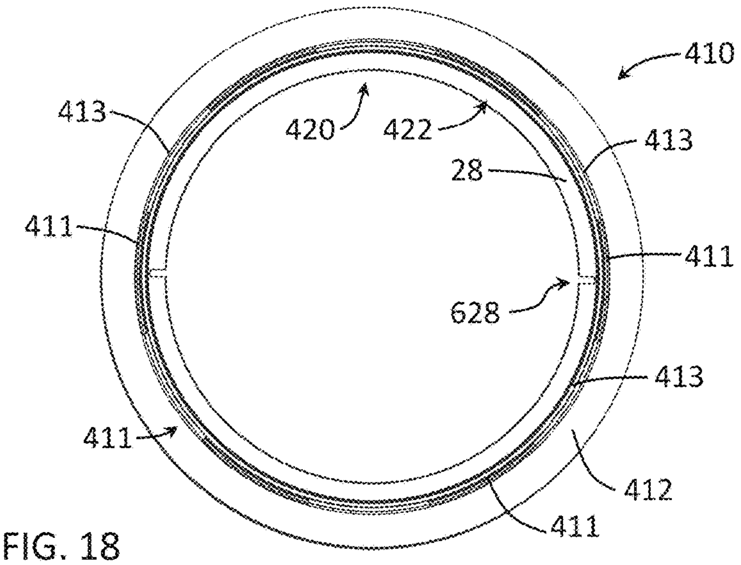
FIG. 18 shows a bottom plan view of the embodiment of FIG. 17A through line 18-18.

The underside (facing away from a ceiling when installed) of a trim accessory 410 is shown in FIG. 18 having a tapered annular panel 412 and an annular inner portion 420, and a retainer 422 along the radially inward portion of the annular inner portion 420. The tapered annular panel 412 and the retainer 422 are similar in configuration to the corresponding features of the embodiment illustrated in FIG. 7. The annular inner portion 420 has an annular inner surface 440 that provides an annular planar surface for mounting of a shield. The annular inner portion 420 is formed in a series of alternating segments of attaching segments 411 and bridging segments 413. In the illustrated embodiment shown in FIGS. 17A, 17B and 18, the annular inner portion 420 has segments of six attaching segments 411 alternating with six bridging segments 413, each of about 30 degrees of arc. The body of the annular inner portion 420 has a lower retaining slot 414 formed or molded into the annular inner surface 440. In the illustrated embodiment, the lower retaining slot 414 is an annular slot, and specifically a circular slot disposed along an arc radius $R_a$ of the trim accessory. As described herein, the lower retaining slot 414 in the annular inner surface 440 receives and retains a hanger element of a light-blocking shield, to attach and secure the shield to the retainer 422 of the trim accessory 410.

As shown in FIG. 19, the lower retaining slot 414 consists of a series of lower attaching slots 442 formed into the attaching segments 411 that each alternate with ones of a series of lower cavity slots 472 formed into the bridging segments 413 of the annular inner portion 420 of the trim accessory. The lower attaching slot 442 is the portion of the lower retaining slot 414 that secures the shield to the trim accessory 410. The lower attaching slot 442 is boundaried by a radially-outer wall surface 444 and a radially-inward wall surface 446 that converge radially, and in the illustrated embodiment, the radially-outer and radially-inner wall surfaces 444 and 466 taper radially inwardly and radially outwardly, respectively, to form a narrow passage 447 defining the narrowest portion of the lower attaching slot 442.

In the attaching segments 411, the lower attaching slot 442 intersects and joins an upper molding slot 432 to provide a through slot in the body of the annular inner portion 420. The upper molding slot 432 is formed along the same arc radius of the trim accessory as the slot in the annular inner surface 440, and in the illustrated embodiment, along the same arc radius as the lower attaching slot 442 slot in the annular inner surface 440. The upper molding slot 432 is formed to assisting in the molding of the lower attaching slot 442. The upper molding slot 432 is boundaried by a radially-outward wall surface 434 and a radially-inward wall surface 436 extending from an upper opening. The radially-outward wall surface 434 of the upper molding slot 432 extends to a radial arc distance $R_{11}$ that is greater than a radial arc distance of a radial arc distance $R_{12}$ of the radially-outer wall surface 444 of the lower attaching slot 442. The radially-outer wall surface 444 of the lower attaching slot 442 curves radially outwardly and upwardly to intersect with the radially-outer wall surface 444 of the lower attaching slot 442, forming an outer retaining rim 445. The narrow passage 447 is sized to allow a distal portion of a hanger element of a shield to pass frictionally through the narrow passage 447 and into the lower attaching slot 442, to engage and retain the hanger element, thereby attaching and securing the light blocking shield to the trim accessory.

As shown in FIG. 20, the lower cavity slot 472 in the bridging segments 413 extends upwardly into the annular inner surface 440, and is boundaried by a radially-outward wall surface 476, a radially-inward wall surface 474, and an end wall 477. The radial width of the lower cavity slot 472 is sufficiently broad to avoid and prevent contact by the hanging element of a light-blocking shield, and no more than light or slight contact, with any of the radially-outward wall surface 476, the radially-inward wall surface 474, and the end wall 477 of the lower cavity slot 472. A bridge 425 remains in the upper body of the annular inner portion 420 that retains the tapered annular panel 412 to the retainer 422 of the annular inner portion 420.

Figure 22:
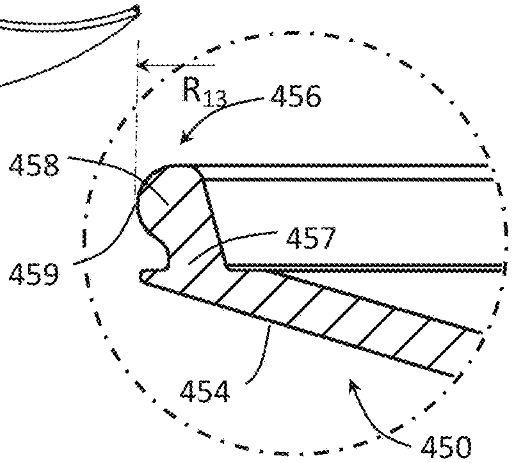
FIG. 22 shows a sectional view of a proximal edge the shield through line 22-22 of FIG. 21, showing a hanger element with a radially-outer projection.

FIGS. 21 and 22 show another embodiment of a light-blocking shield 450. The shield 450 includes a light-blocking portion 452 that blocks or screens light emitted from the recessed lamp, and has a proximal edge 454 that aligns with, and engages and attaches to, the annular inner portion 420 of the trim accessory 410, as shown in FIGS. 23 and 24.

Figure 23:
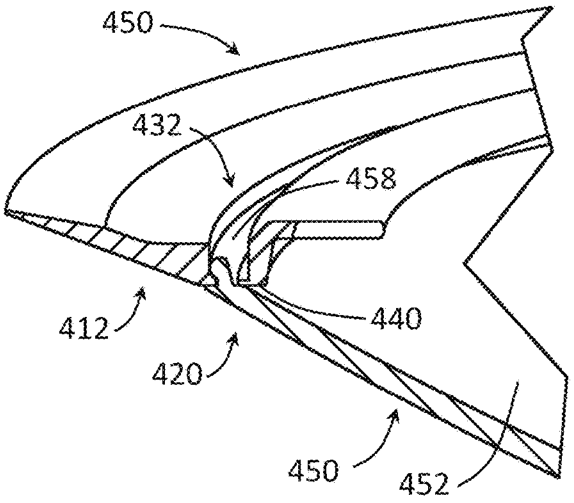
FIG. 23 shows an assembly of the trim accessory and the light-blocking shield, sectioned through the attaching segment of the trim accessory.
Figure 24:
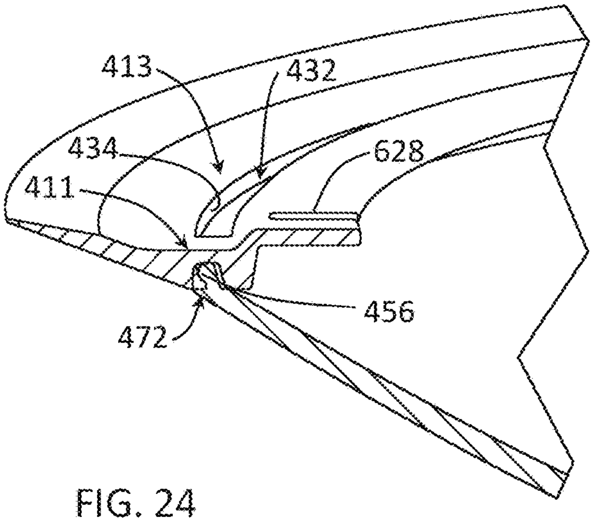
FIG. 24 shows the assembly of the trim accessory and the light-blocking shield, sectioned through the bridging segment of the trim accessory.

In the illustrated embodiment, shown in FIG. 22, the affixment is shown as a hanger element 456 extending from the upper surface of the proximal edge 454 of the shield 550, that engages and attaches to the trim accessory 410 as shown in FIGS. 23 and 24, within the lower attaching slot 442 formed into the undersurface of the annular inner portion 420 of the trim accessory 410, described and illustrated in FIG. 19. The hanger element 456, shown in cross section in FIG. 22, has a narrowed neck portion 457 that connects the hanger element 456 to the proximal edge 454, and a distal projection 458 that extends radially outwardly. The distal projection 458 of the shield 450 has a rounded, radially outer-most surface 459 having a radial arc distance $R_{13}$ that is only slightly greater than the radial arc distance $R_{12}$ of the radially-outer wall surface 444 of the lower attaching slot 442. The distance difference between $R_{12}$ and $R_{13}$ is typically from about 0.005 inch to about 0.04 inch, sufficient to cause the distal projection 458 to be biased radially inwardly when the pressed upwardly into the tapered opening 443 the narrow passage 447, and that allows distal projection 458 to release radially outwardly into the upper molding slot 432, and be restrained from withdrawal by the lower attaching slot 442, which will prevent the attached hanger element of the shield from dropping out of the lower attaching slot 442 portion of the lower slot 414 of the trim accessory 410 under the force of gravity. If desired, a user can remove the shield 450 from the trim accessory 410 by applying a manual force downwardly on the shield, which forces the distal projection 458 radially inwardly and down through the narrow passage 447, and out from the opening 443 of the lower attaching slot 442.

The light-blocking portion 452 extends into the light-emitting area to an inner edge 460 to form a light-emitting opening. As in other embodiments of a shield described herein, an inner edge 460 of the light-blocking portion 452 extends radially inwardly to a radius from the center axis of the recessed lamp. The ratio of the radius to the inner edge 460 of the light-blocking portion 452 is about 10% to 90%, more typically about 30% to about 50%, and preferably about 40% to about 60% of a radius of the proximal edge 454 of the shield 450.

In some embodiments, the proximal edge 454 of the shield 450 extends in an arc, less than the complete circumference, along the annular inner portion, the arc being at least 90 degrees and up to 270 degrees, more preferably of at least 120 degrees and up to 240 degrees, of the circumference of the annular inner edge. The greater the extension of the arc of the proximal edge 454 along the circumference of the annular inner portion, the better the engagment and affixing of the shield 450 to the trim accessory 410.

Figure 25:
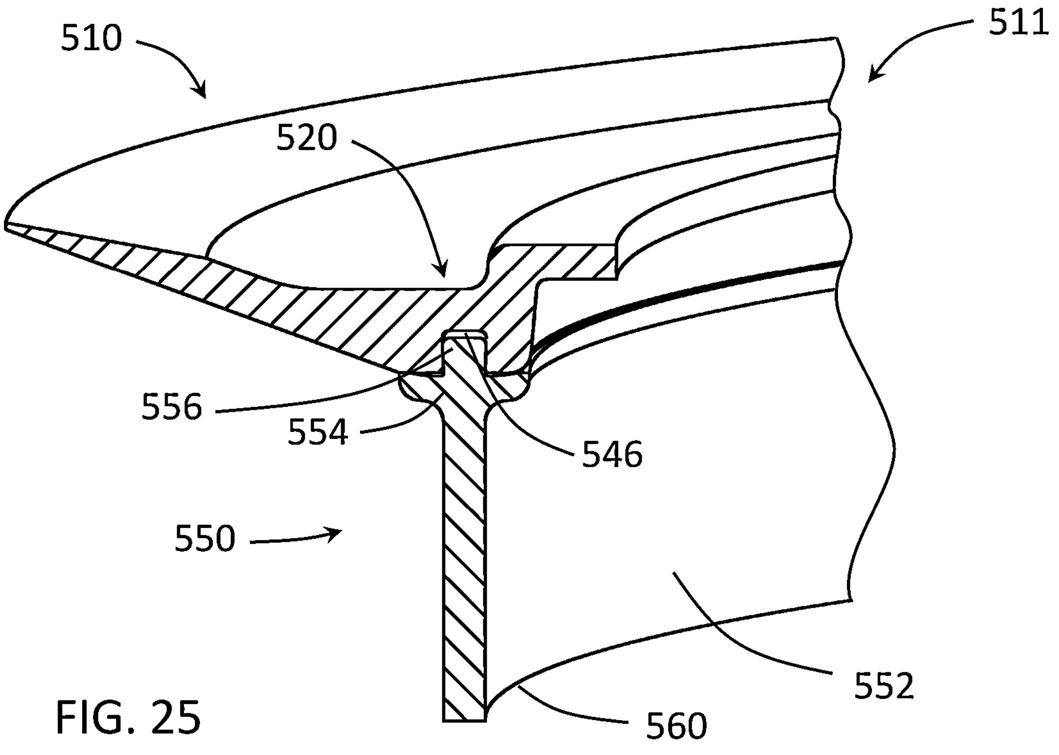
FIG. 25 shows another embodiment of an assembly of trim accessory and a light-blocking shield.

FIG. 25 shows another embodiment of a trim-shield accessory 511 that shows a trim accessory 510 and a shield 550 that is a separate element. The shield 550 also includes a proximal portion 554 having a hanger element 556 extending from the upper surface of the proximal edge 554 that aligns with, and affixes and secures to, an annular slot 546 formed into an undersurface of the annular inner portion 520 of the trim accessory 510. The light-blocking portion 552 of the shield 550 includes a vertical wall extending from the proximal portion 554 to a lower distal edge 560. As described herein for other embodiments, the vertically-extending light-blocking portion 552 can extend from proximal portion 554 axially along a circumference portion of the annular inner portion 520 of the trim accessory 510, along a base arc of at least 15 degrees and up to 360 degrees. The axially-(vertically-)extending distal edge 560 of the shield can extend along an edge arc, independently of the base arc of extension of the shield itself, of at least 15 degrees and up to 360 degrees, and the edge arc can be the same or less than the base arc.

Figure 26:
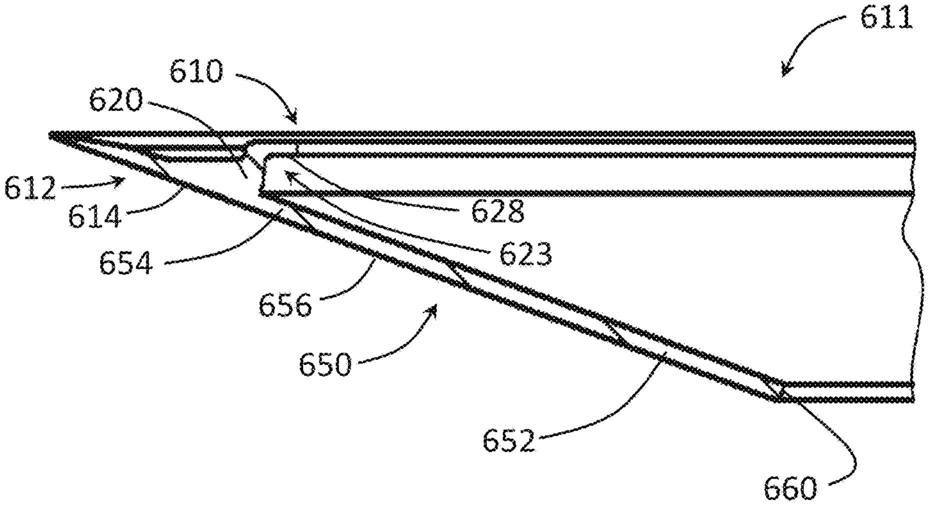
FIG. 26 shows another embodiment of a trim accessory with integral shield.
Figure 27:
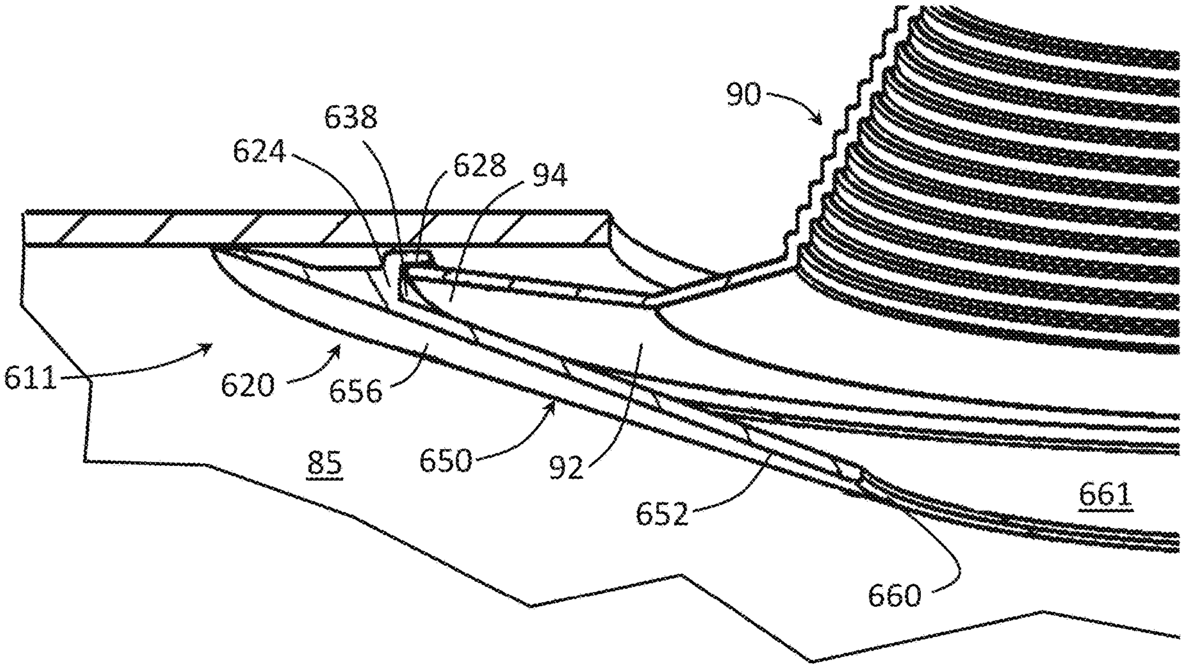
FIG. 27 shows the trim accessory of FIG. 26 attached to an outer-extending trim of a recessed lamp, in contact with the ceiling surface that surrounds the recessed lamp.

In various embodiments of the invention, a shield element can be unitary with a trim accessory to form a unitary trim-shield accessory. FIG. 26 shows a unitary trim-shield accessory 611 that includes a trim accessory portion 610 and a shield portion 650. The shield portion 650 includes a proximal edge 654 that aligns and is unitary with a portion of the annular inner portion 620, and a distal inner rim 660 that outlines an opening 661 through which light emits. In some embodiments, the outer facing surface 656 of the shield portion 650 extends in the same angular plane as the outer facing surface 614 of the proximal portion 612 of the trim accessory portion 610. In the illustrated embodiment, the shield portion 650 extends to form the entire circumference of the annular inner portion 620. The proximal edge 654 can optionally extend in an arc along only a portion of the circumference of the annular inner portion 620, the arc being at least 15 degrees, for example, at least 20 degrees, at least 30 degrees, at least 45 degrees, at least 60 degrees, or at least 90 degrees, and up to 360 degrees, for example, up to 270 degrees, or up to 180 degrees, and more preferably of at least 120 degrees and up to 240 degrees, of the circumference of the annular inner portion 620. FIG. 27 shows the unitary trim-shield accessory 611 engaged with and attached to an outer-extending trim 92 of a recessed lamp 90, in contact with the ceiling surface 85 that surrounds the recessed lamp 90. The annular inner portion 620 includes a radially-inwardly extending ledge 628, which together with the proximal edge 654 of the shield portion 550 defines and forms the boundary of a pocket to retain the outer periphery 94 of the outer-extending trim 92 of the recessed lamp 90. The vertical height of the inner surface 638 of the annular vertical wall 624 of the annular inner portion 620 should be greater than a thickness of the outer periphery 94 of the outer-extending trim 92 of the recessed lamp 90, to ensure the outer periphery 94 of the outer-extending trim trim 92, when inserted into the pocket 623, does not extend into contact with the proximal edge 654 of the shield portion 650, and to permit the trim accessory 611 to be rotated freely, without friction or binding, around the outer periphery 94 of the outer-extending trim 92 of the recessed lamp 90.

Figure 28:
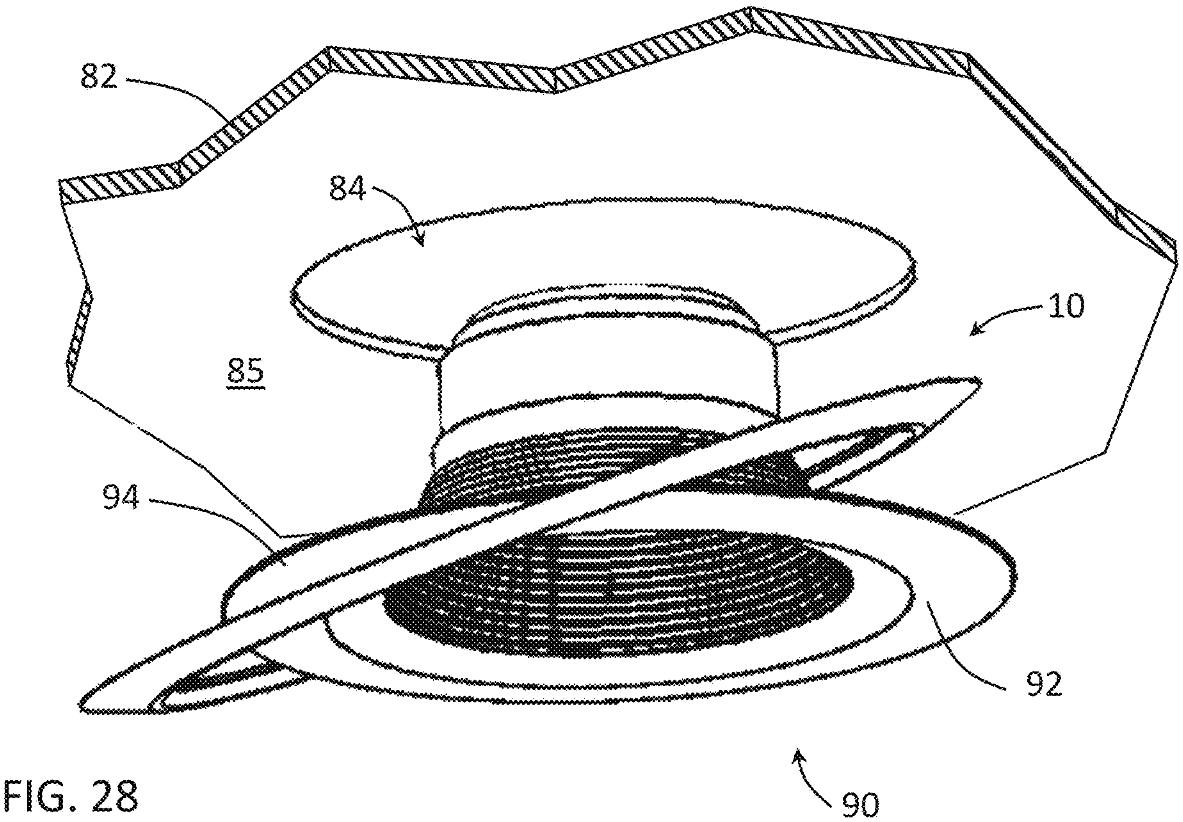
FIG. 28 shows a step in a method for installing a trim accessory onto an extending trim of a recessed lighting fixture.

The present invention provides a method for installing a trim accessory onto an extending trim of a recessed lighting fixture, which can be either already installed or that will be installed into a ceiling. In both cases as illustrated in FIG. 28, the existing light fixture 90 is drawn down from its recessed position so that the outer-extending trim 92 of the recessed lighting is spaced apart from the undersurface 85 of the ceiling by about ½ inch to 1½ inches (about 1-4 centimeters (cm)), to create a gap or space between the upper surface of the existing outer-extending trim 92 and the ceiling undersurface 85. The trim accessory 10 is then handled to tilt at a slight angle and maneuvered to pass in series a leading edge, the side edges, and the trailing edge, of the outer periphery 94 of the outer-extending trim 92 through the tilted opening of the trim accessory 10. Once the outer-extending trim 92 of the light fixture 90 has been passed through the center of the trim accessory 10, the user positions the trim accessory 10 above the outer-extending trim 92, with the captured member or ledge of the retainer 22 in vertical registry with and above the distal periphery of the outer periphery 94 of the recessed lamp 90. The trim accessory 10 is then lowered down onto the outer periphery 94, with the captured member or ledge of the retainer 22 of the trim accessory 10 resting upon the outer periphery 94 of the light fixture 90. With the trim accessory 10 now nested to the outer periphery 94 of the light fixture 90, the trim accessory 10 will remain suspended and in place. The trim accessory 10 can be free to revolve around the outer-extending trim of the light fixture to a desired radial position, to align a light blocking or light altering feature of the trim accessory 10 that does not extend 360 degrees.

When the trim accessory 10 is in its final radial position, the light fixture 90 is pushed vertically upward towards the 85 ceiling, to allow the spring fingers of the recessed lighting fixture (the means for creating axial force to draw the light fixture into the recess of the ceiling) to provide continuous upward force that will hold the trim accessory 10 in place against the under surface 85 of the ceiling 82. To make adjustments in the radial position of the trim accessory, the trim accessory and/or outer-extending trim of the light fixture is pulled vertically downward, and the installation can be repeated or adjusted as needed or desired.

FIG. 17 also shows an alternative embodiment of a trim accessory, illustrated by trim accessory 410, having diametrically opposed slots 628 formed into the inner edge 30 in the ledge 28 of the retainer 22 to aid installation of the trim accessory onto an extending trim of a recessed lighting fixture. The slots 628 define a lateral opening that allows the full diameter of the extending trim of the recessed lighting fixture to pass through without contact.

In various embodiments the material of the trim accessory and its elements have a hardness and/or flexibility as define by durometer. Durometer measurements and standards are described in the American Society for Testing and Material specification ASTM D2240, the disclosure of which is incorporated by reference in its entirety. A duroreter value can be measured for a material under one or more standards, which can include Shore 00, Shore A, and Shore D. The Shore D durometer value of a material is typically from about D10 to about D75, more preferably about D15 to about D70. In some embodiment, a Shore D durometer of about or above 70 provides a material that may be too ridge for a particular use. In other embodiments, a Shore D durometer of about or below 15 may be too flexible for a particular use.

In some embodiments, one separate element can have a material hardness or flexibility measured by durometer value different from another element. For example, the trim accessory that is fitted to an outer-extending trim of a recessed lamp can be made of a material that is more (or less) flexible and having a lower (or higher) durometer value (for example, a D60) than the material of a separate shield element (for example, a D70-75). In some embodiments, one portion of a unitary element can comprise a material that is more (or less) flexible and having a lower (or higher) durometer value than the material in another distinct portion of the unitary element. For example, in a trim accessory, a retainer portion of a unitary trim accessory may have a lower durometer value (more flexible) than the annular inner portion and/or the tapered annular panel of the trim accessory (less flexible or more rigid), to improve or simplify installation of the trim accessory to the outer-extending trim of the recessed lamp; or a tip portion of a tapered annular panel of a trim accessory may have a lower durometer value (more flexible) than the remaining portion of the tapered annular panel, to provide a better fit of the tip with the ceiling or other surface. Such unitary elements made from two or more different materials having different durometer values can be co-molded or overmolded by well known means.

In various embodiments of the invention, the trim accessory, and the elements of the trim accessory such as the tapered annular panel, the retainer(s), and the shield, can be made from the same material, or of different materials. In various embodiments, the material can be a flexible material, to allow the shape of the flexible element made from the material to bend, be biased, or manipulated out of its natural, unbiased shape. In various embodiments, the material can be a resilient material, to allow the element made from the resilient material to return spontaneously to its natural, unbiased shape after the element is bent, biased or manipulated out of such shape, without cracking or breaking. In various embodiments, the material of an element or elements can be both flexible and resilient. In some embodiments, the material of one or more of the elements of the trim accessory is selected from the group consisting of an elastomeric material, a thermoplastic material, a thermoset resin material, a metal, and a combination thereof. In various embodiments, an elastomeric material can be a loosely-cross-linked polymers. Non-limiting examples of an elastomeric material are selected from the group consisting of natural rubbers, styrene-butadiene block copolymers, polyisoprene, polybutadiene, ethylene propylene rubber (EPR), ethylene propylene diene rubber (EPDM), silicone elastomers, fluoroelastomers, acrylonitrile butadiene styrene (ABS), polycarbonate, polyurethane elastomers, nitrile rubbers, thermoplastic elastomers, and combination and mixtures thereof. One example of a thermoplastic elastomer (TPE) is a thermoplastic vulcanizate (TPV) that comprises cured EPDM rubber particles encapsulated in a polypropylene thermoset polymer, and is available as Santoprene™. A preferred example is a polycarbonate/acrylonitrile butadiene styrene (PC/A-BS), available from Bayer as Bayblend FR-110®.

The above process works for either a one-piece or multi-piece trim accessory. If a two-piece trim accessory is used, a trim accessory, such as trim accessory 310, is installed onto the outer-extending trim of the light fixture as described above, then the shield, such as shield 350, is installed or affixed to the as trim accessory. In the embodiments described herein, the second, separate shield can be adjusted to a desired radial position without making any adjustment to the the trim accessory.

I claim:

1. A trim accessory configured to attach to an outer-extending trim of a recessed lamp, the trim accessory comprising:

i) an annular inner portion:

ii) a tapered annular panel extending radially outwardly from the annular inner portion, including an axially down-facing surface, an axially up-facing surface, and an annular radially-outer edge, wherein a thickness of the tapered annular panel between the axially down-facing surface and the axially up-facing surface tapers inwardly toward the annular radially-outer edge to a tip; and iii) one or more retainer extending radially inwardly from the annular inner portion, the one or more retainer including a confining member comprising an annular vertical wall extending axially upward from the annular inner portion, which confines a lateral movement of the outer-extending trim of the recessed lamp, and a captured member comprising a ledge that extends radially inwardly from a distal end of the annular vertical wall, which engages and confines an axial, upward movement of the outer-extending trim of the recessed lamp, to secure the trim accessory to the recessed lamp.

2. The trim accessory according to claim 1 wherein the axial member of the retainer extends axially from the annular inner portion.

3. The trim accessory according to claim 1 wherein an inner-facing surface of the ledge of the retainer extends a first distance axially from the plane p defined by the periphery of the tip of the annular outer edge of the tapered annular panel.

4. The trim accessory according to claim 1 wherein outer-facing surface is a planar surface.

5. The trim accessory according to claim 1 wherein the tapered annular panel is circular.

6. The trim accessory according to claim 1 wherein the elastomeric material is selected from the group consisting of a natural rubber, styrene-butadiene block copolymers, polyisoprene, polybutadiene, ethylene propylene rubber, ethylene propylene diene rubber, silicone elastomers, fluoroelastomers, polyurethane elastomers, nitrile rubbers, thermoplastic elastomers, and combination and mixtures thereof.

7. The trim accessory according to claim 1 further including a shield extending axially outwardly and radially inwardly from along at least a portion of the annular inner portion.

8. The trim accessory according to claim 7 wherein the shield extends radially inwardly from the annular inner portion 20 along an arc of at least 15 degrees and up to 270 degrees.

9. The trim accessory according to claim 7 wherein the shield is formed integrally with the annular inner portion of the trim accessory.

10. The trim accessory according to claim 9 wherein an inner edge of the ledge has diametrically opposed slots that define an opening that allows the full diameter of the outer-extending trim of a recessed lamp to pass through without contact.

11. The trim accessory according to claim 7 wherein the shield is a separate element that includes an affixment extending from an upper surface of a proximal edge of the shield, to affix the shield to an undersurface of the annular inner portion of the trim accessory.

12. The trim accessory according to claim 11 wherein the affixment can be a mechanical affixment, an adhesive affixment, a magnetic affixment, a threaded affixment, a frictional affixment, or a combination thereof.

13. The trim accessory according to claim 11 wherein the affixment is a frictional affixment comprising a hanger element extending from an upper surface of a proximal edge of the shield, to affix the shield to a lower retaining slot formed into an undersurface of the annular inner portion of the trim accessory.

14. The trim accessory according to claim 13 wherein the lower retaining slot comprises a series of lower attaching slots that intersect and join an upper molding slot, each lower attaching slot boundaried by a radially-outer wall surface and a radially-inward wall surface, and each upper molding slot boundaried by a radially-outward wall surface and a radially-inward wall surface, wherein the radially-outer wall surface of the lower attaching slot curves radially outwardly and upwardly to intersect with the radially-outer wall surface of the lower attaching slot, forming an outer retaining rim, and the hanger element includes a narrowed neck portion that connects the hanger element to the proximal edge of the shield, and a distal projection that extends radially outwardly and having a rounded, radially outermost surface having a radial arc distance that is greater than the radial arc distance of the radially-outer wall surface of the lower attaching slot.

15. The trim accessory according to claim 14 wherein an inner edge of the ledge has diametrically opposed slots that define an opening that allows the full diameter of the outer-extending trim of a recessed lamp to pass through without contact.

16. The trim accessory according to claim 7 wherein an inner edge of the ledge has diametrically opposed slots that define an opening that allows the full diameter of the outer-extending trim of a recessed lamp to pass through without contact.

17. The trim accessory according to claim 1 wherein an inner edge of the ledge has diametrically opposed slots that define an opening that allows the full diameter of the outer-extending trim of a recessed lamp to pass through without contact.

* * * * *